United States Patent
Park et al.

(10) Patent No.: US 11,225,568 B2
(45) Date of Patent: Jan. 18, 2022

(54) POLYETHYLENE COPOLYMER AND METHOD FOR PREPARING SAME

(71) Applicant: LG Chem, Ltd., Seoul (KR)

(72) Inventors: Jongsang Park, Daejeon (KR); Ki Soo Lee, Daejeon (KR); Eun Kyoung Song, Daejeon (KR); Daesik Hong, Daejeon (KR); Ye Jin Lee, Daejeon (KR); Joongsoo Kim, Daejeon (KR); Eunyoung Shin, Daejeon (KR); Youngsuk You, Daejeon (KR); Jinyoung Kwak, Daejeon (KR)

(73) Assignee: LG Chem, Ltd.

( * ) Notice: Subject to any disclaimer, the term of this patent is extended or adjusted under 35 U.S.C. 154(b) by 10 days.

(21) Appl. No.: 16/635,239

(22) PCT Filed: Dec. 6, 2018

(86) PCT No.: PCT/KR2018/015430
§ 371 (c)(1),
(2) Date: Jan. 30, 2020

(87) PCT Pub. No.: WO2019/124835
PCT Pub. Date: Jun. 27, 2019

(65) Prior Publication Data
US 2021/0032449 A1 Feb. 4, 2021

(30) Foreign Application Priority Data

Dec. 20, 2017 (KR) .................. 10-2017-0176416
Dec. 4, 2018 (KR) .................. 10-2018-0154616

(51) Int. Cl.
*C08F 210/16* (2006.01)
*C08F 110/02* (2006.01)
(Continued)

(52) U.S. Cl.
CPC .............. *C08L 23/08* (2013.01); *C08F 4/649* (2013.01); *C08F 4/6592* (2013.01);
(Continued)

(58) Field of Classification Search
CPC . C08F 210/16; C08F 4/65927; C08F 4/65925
See application file for complete search history.

(56) References Cited

U.S. PATENT DOCUMENTS 8,173,232 B2 * 5/2012 Mandare ................. B32B 27/32
428/35.7
8,372,931 B2 * 2/2013 Hermel-Davidock .......
C08F 10/00
526/352
(Continued)

FOREIGN PATENT DOCUMENTS

CN 106661160 A 5/2017
CN 107207661 A 9/2017
(Continued)

OTHER PUBLICATIONS

Alexakis et al., "Mild Protection and Deprotection of Alcohols as Ter-Butyl Ethers in the Field of Pheromone Synthesis," Tetrahedron Letters, vol. 29, No. 24, 1988, pp. 2951-2954.
(Continued)

*Primary Examiner* — Rip A Lee
(74) *Attorney, Agent, or Firm* — Lerner, David, Littenberg, Krumholz & Mentlik, LLP

(57) ABSTRACT

The present invention relates to a polyethylene copolymer which has excellent processability and long-term durability, and thus is useful for hollow molding of a pipe or the like.

16 Claims, 2 Drawing Sheets

(51) Int. Cl.
*C08F 4/76* (2006.01)
*C08F 4/64* (2006.01)
*C08L 23/08* (2006.01)
*C08F 4/649* (2006.01)
*C08F 4/6592* (2006.01)
*C08F 210/02* (2006.01)
*C08F 210/04* (2006.01)
*C08F 210/14* (2006.01)

(52) U.S. Cl.
CPC .......... *C08F 210/02* (2013.01); *C08F 210/04* (2013.01); *C08F 210/14* (2013.01); *C08F 210/16* (2013.01); *C08L 2203/18* (2013.01)

(56) References Cited

U.S. PATENT DOCUMENTS

| | | | | |
|---|---|---|---|---|
| 8,629,214 | B2* | 1/2014 | Karjala | C08J 5/18 |
| | | | | 525/191 |
| 8,829,115 | B2* | 9/2014 | Hermel-Davidock | |
| | | | | C08L 23/08 |
| | | | | 525/240 |
| 8,846,835 | B2* | 9/2014 | Ker | C08L 23/06 |
| | | | | 526/113 |
| 8,921,500 | B2* | 12/2014 | Karjala | C08F 10/00 |
| | | | | 526/165 |
| 9,527,941 | B2* | 12/2016 | Demirors | C08F 210/16 |
| 9,834,712 | B2* | 12/2017 | Kapur | B32B 27/32 |
| 10,618,989 | B2* | 4/2020 | Doufas | B01J 31/2295 |
| 2005/0153830 | A1 | 7/2005 | Jensen et al. | |
| 2010/0120981 | A1 | 5/2010 | Shin et al. | |
| 2010/0121006 | A1 | 5/2010 | Cho et al. | |
| 2012/0041149 | A1 | 2/2012 | Shin et al. | |
| 2012/0283399 | A1 | 11/2012 | Yamamoto et al. | |
| 2013/0225834 | A1 | 8/2013 | Shin et al. | |
| 2014/0179885 | A1 | 6/2014 | Shin et al. | |
| 2015/0299353 | A1 | 10/2015 | Shin et al. | |
| 2017/0029538 | A1 | 2/2017 | Song et al. | |
| 2017/0044278 | A1 | 2/2017 | Lee et al. | |
| 2017/0145122 | A1 | 5/2017 | Kim et al. | |
| 2017/0233511 | A1 | 8/2017 | Sun et al. | |
| 2018/0030180 | A1 | 2/2018 | Sung et al. | |
| 2018/0037676 | A1 | 2/2018 | Song et al. | |
| 2018/0094090 | A1 | 4/2018 | Shin et al. | |
| 2018/0155473 | A1 | 6/2018 | Kuhlman | |
| 2018/0201638 | A1 | 7/2018 | Piao et al. | |
| 2018/0371116 | A1 | 12/2018 | Kim et al. | |
| 2019/0085100 | A1 | 3/2019 | Song et al. | |
| 2020/0339790 | A1* | 10/2020 | Kim | C08F 210/16 |

FOREIGN PATENT DOCUMENTS

| | | |
|---|---|---|
| EP | 3390524 A1 | 10/2018 |
| JP | 2014133880 A | 7/2014 |
| KR | 20080097949 A | 11/2008 |
| KR | 20100031461 A | 3/2010 |
| KR | 101212637 B1 | 12/2012 |
| KR | 20150139462 A | 12/2015 |
| KR | 20150144281 A | 12/2015 |
| KR | 20160057291 A | 5/2016 |
| KR | 20160147640 A | 12/2016 |
| KR | 20170008987 A | 1/2017 |
| KR | 20170055149 A | 5/2017 |
| KR | 20170099691 A | 9/2017 |
| KR | 20170106110 A | 9/2017 |
| RU | 2374272 C2 | 11/2009 |
| WO | 2004076499 A1 | 9/2004 |
| WO | 2008136621 A1 | 11/2008 |
| WO | 2011078054 A1 | 6/2011 |
| WO | 2016172279 A1 | 10/2016 |
| WO | 2017186728 A1 | 11/2017 |
| WO | 2017207493 A1 | 12/2017 |
| WO | 2019125065 A1 | 6/2019 |

OTHER PUBLICATIONS

International Search Report from Application No. PCT/KR2018/015430 dated Apr. 11, 2019, 3 pages.

Extended European Search Report with Written Opinion for EP18891303.2 dated Jul. 20, 2020; 9 pages.

Russian Search Report for Application No. 2020106597, dated Oct. 27, 2021, 3 pages.

Chinese Search Report for Application No. 20188045250.3 dated Dec. 3, 2021, 2 pages.

* cited by examiner

[FIG. 1]
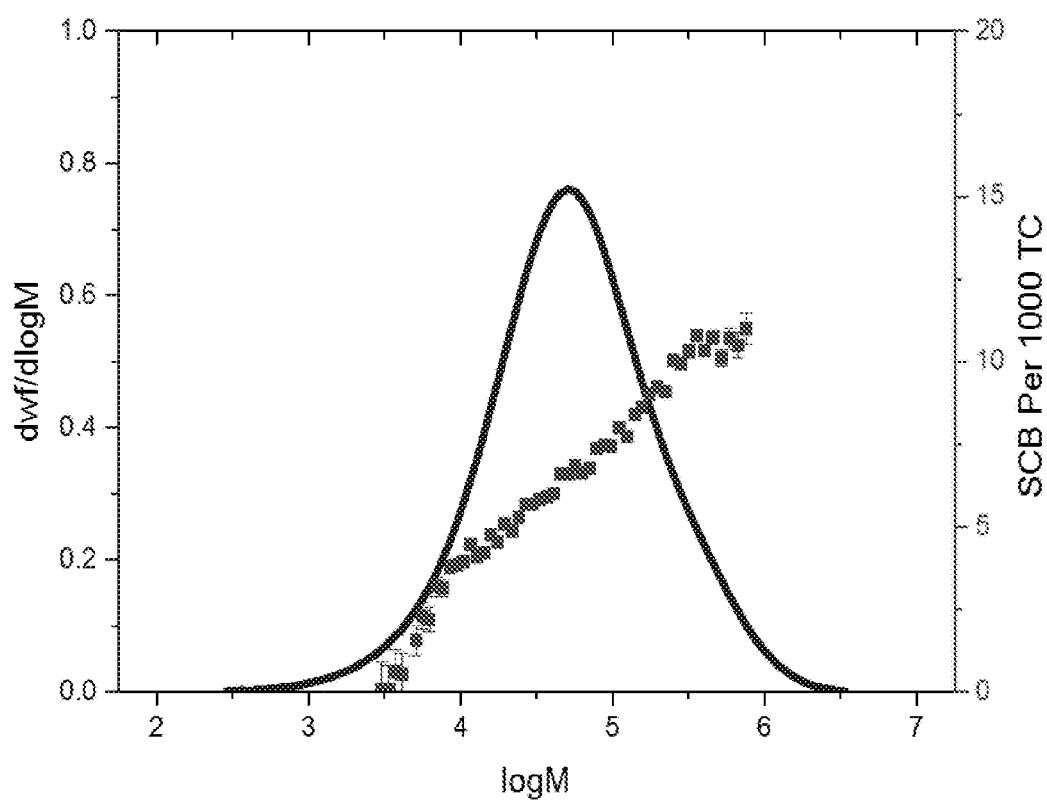

[FIG. 2]
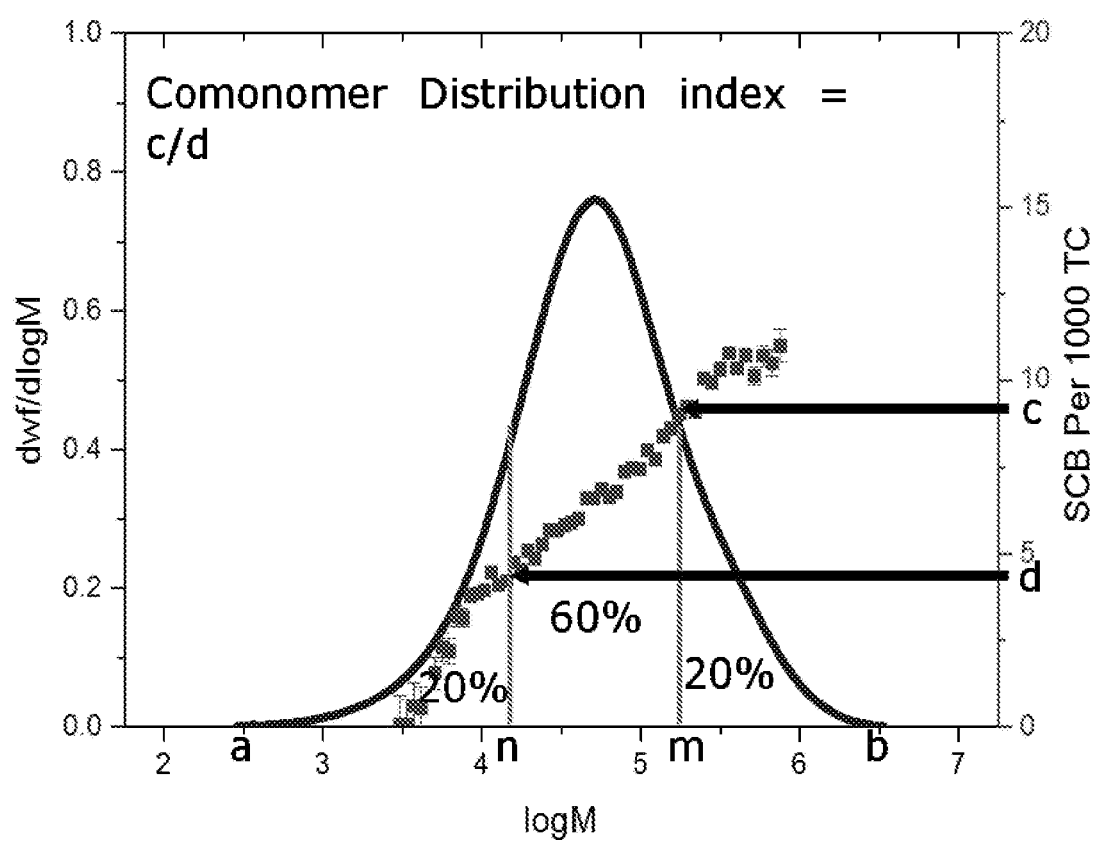

POLYETHYLENE COPOLYMER AND METHOD FOR PREPARING SAME

CROSS-REFERENCE TO RELATED APPLICATIONS

The present application is a national phase entry under 35 U.S.C. § 371 of International Application No. PCT/KR2018/015430 filed Dec. 6, 2018, which claims priority from Korean Patent Application No. 10-2017-0176416 filed Dec. 20, 2017 and Korean Patent Application No. 10-2018-0154616 filed Dec. 4, 2018, all of which are incorporated herein by reference.

TECHNICAL FIELD

The present invention relates to a polyethylene copolymer and a method for preparing the same.

BACKGROUND ART

Polyolefin resins used in large-diameter high-pressure pipes generally require high pressure resistance and excellent processability. The high pressure resistance is generally a physical property which can be expressed in a high density region. This is because the modulus increases as the degree of crystallization in the polyolefin resin is higher, and thus the ability to withstand high pressure is increased.

However, for ordinary pipes, long-term pressure resistance stability should be guaranteed for at least 50 years. However, when the density is high, there is a disadvantage that resistance to the brittle fracture mode is degraded and the long term pressure resistance characteristic is deteriorated. Further, when the molecular weight of the polyolefin resin is low or the polydispersity index is narrow, a sagging phenomenon occurs at the time of processing a large-diameter pipe and the processing is difficult. Therefore, in order to solve these problems, a polyolefin resin having a high molecular weight and a very wide polydispersity index must be applied.

Further, when the molecular weight of the polyolefin resin is high, the extrusion load is increased and pipe processability declines, and thus there is a limitation that the appearance is poor.

Thus, there is a continuing need for preparation of superior products having a balance between long-term stability and processability.

DETAILED DESCRIPTION OF THE INVENTION

Technical Problem

An object of the present invention is to provide a polyethylene copolymer which has excellent processability and long-term durability and thus is useful for hollow molding of a pipe or the like.

Another object of the present invention is to provide a method for preparing the aforementioned polyethylene copolymer.

A further object of the present invention is to provide a molded article including the aforementioned polyethylene copolymer.

Technical Solution

According to one embodiment of the invention, a polyethylene copolymer is provided, including an ethylene-derived repeating unit and an alpha-olefin-derived repeating unit having 3 or more carbon atoms and satisfying the following Equation 1.

$$\text{slow crack growth (SCG) index} \leq (\text{carbon number of the alpha olefin})^{1/2} \times 5 \quad \text{[Equation 1]}$$

In the above Equation 1, the SCG index is a value (p/q) obtained by dividing the melt index (p) of the polyethylene copolymer measured according to ASTM 1238 (load of 21.6 kg, 190° C.) by the comonomer distribution index (q) of the polyethylene copolymer, and the comonomer distribution index (CDI) is calculated by the following Equation 2 based on a molecular weight distribution graph (where the x-axis represents the molecular weight of the polymer chain and the y-axis represents the content of the polymer chain) measured by gel permeation chromatography with respect to the polyethylene copolymer.

$$\text{Comonomer distribution index (CDI)} = c/d \quad \text{[Equation 2]}$$

In the above Equation 2, c is the short-chain branch (SCB) content (measured by FT-IR) of 2 to 7 carbon atoms per 1000 carbon atoms of the polymer chain, which is a molecular weight value m in which an area (s1) between the molecular weight distribution curve and the x-axis in the section of $a \leq x \leq m$ is 80% of an area (s2) between the molecular weight distribution curve and the x-axis in the section of $a \leq x \leq b$, d is the short chain branch (SCB) content (measured by FT-IR) of 2 to 7 carbon atoms per 1000 carbon atoms of the polymer chain, which is a molecular weight value n in which an area (s3) between the molecular weight distribution curve and the x-axis in the section of $a \leq x \leq n$ is 20% of an area (s4) between the molecular weight distribution curve and the x-axis in the section of $a \leq x \leq b$, a is the minimum value of the molecular weight which is represented by the x-axis in the molecular weight distribution graph, and b is the maximum value of the molecular weight which is represented by the x-axis in the molecular weight distribution graph.

The present inventors found through experiments that when the polyethylene copolymer satisfying the condition of Equation 1 is used, excellent processability can be realized through a relatively low melt viscosity, and at the same time, the long-term brittle fracture resistance can be improved by controlling the molecular weight distribution of the comonomer and thus excellent long-term durability can be realized. The present invention has been completed on the basis of such findings.

In particular, it appears that the polyethylene copolymer satisfying the condition of Equation 1 is obtained by the preparation method of the polyethylene copolymer according to another embodiment described later. Specifically, it can be realized by polymerizing an ethylene monomer and an alpha olefin monomer in the presence of a hybrid supported catalyst which includes: a transition metal mixture including a first mixture including a first transition metal compound containing at least one selected from the group consisting of the following Chemical Formulas 2 and 3, and a second transition metal compound containing at least one selected from the group consisting of the following Chemical Formulas 4 to 7, or a second mixture including a first transition metal compound containing the following Chemical Formula 1, and a second transition metal compound containing at least one selected from the group consisting of the following Chemical Formulas 4, 6, and 7; and a support on which the transition metal mixtures are supported.

The ethylene-derived repeating unit is a repeating unit formed by polymerization of an ethylene monomer, and the alpha-olefin-derived repeating unit means a repeating unit formed by the polymerization of an alpha-olefin monomer. The alpha olefin monomer has 3 or more carbon atoms, or 3 to 20 carbon atoms, or 3 to 10 carbon atoms, and examples thereof include one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicocene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, and 3-chloromethylstyrene.

In the ethylene/alpha-olefin copolymer, the content of the alpha-olefin as the comonomer is not particularly limited, and may be appropriately selected depending on the use, purpose, etc. of the copolymer. More specifically, it may be more than 0 mol % and 99 mol % or less.

More specifically, Equation 1 may be expressed by the following Equation 1-1.

$$\text{SCG index} \leq (\text{carbon number of the alpha olefin})^{1/2} \times 4.6 \quad \text{[Equation 1-1]}$$

In the above Equation 2, c may be the short chain branch (SCB) content of 2 to 7 carbon atoms per 1000 carbon atoms of the polymer chain (measured by FT-IR), which is a molecular weight value m in which the area (s1) between the molecular weight distribution curve and the x-axis in the section of $a \leq x \leq m$ is 80% of the area (s2) between the molecular weight distribution curve graph and the x-axis in the section of $a \leq x \leq b$. The area (s1) between the molecular weight distribution curve and the x-axis in the section of $a \leq x \leq m$ may mean an integral value in the range of $a \leq x \leq m$ in the molecular weight distribution graph, and the area (s2) between the molecular weight distribution curve and the x-axis in the section of $a \leq x \leq b$ may mean an integral value in the range of $a \leq x \leq b$.

Here, a is a positive real number indicating the minimum value of the molecular weight in the x-axis in the molecular weight distribution graph, b is a positive real number indicating the maximum value of molecular weight in the x-axis in the molecular weight distribution graph, and m is a positive real number satisfying $a \leq m \leq b$ and may satisfy s1=0.8×s2. More specifically, the following Equation 3 can be satisfied.

$$\int_a^m f(x)dx = 0.8 \int_a^b f(x)dx \quad \text{[Equation 3]}$$

Further, in Equation 2, d may be the short-chain branch (SCB) content of 2 to 7 carbon atoms per 1000 carbon atoms of the polymer chain (measured by FT-IR), which is a molecular weight value n in which an area (s3) between the molecular weight distribution curve and the x-axis in the section of $a \leq x \leq n$ is 20% of the area (s4) between the molecular weight distribution curve and the x-axis in the section of $a \leq x \leq b$. The area (s3) between the molecular weight distribution curve and the x-axis in the section of $a \leq x \leq n$ may mean an integral value in the range of $a \leq x \leq n$ in the molecular weight distribution graph, and the area (s4) between the molecular weight distribution curve and the x-axis in the section of $a \leq x \leq b$ may mean an integral value in the range of $a \leq x \leq b$.

Here, a is a positive real number indicating the minimum value of the molecular weight which is represented by the x-axis in the molecular weight distribution graph, b is a positive real number indicating the maximum value of the molecular weight on the x-axis in the molecular weight distribution graph, and n is a positive real number satisfying $a \leq n \leq b$ and may satisfy s3=0.2×s4. In this case, n is a positive real number satisfying $a \leq n \leq b$. More specifically, the following Equation 4 can be satisfied.

$$\int_a^n f(x)dx = 0.2 \int_a^b f(x)dx \quad \text{[Equation 4]}$$

A specific example of calculating the comonomer distribution index (CDI) according to the aforementioned Equations 2, 3, and 4 is shown in FIG. 2.

The term "polymer chain(s)" contained in the "polyethylene copolymer" may refer to a plurality of polymer chains formed when the polyethylene copolymer is polymerized and produced. The molecular weight and the like of these polymer chains can be confirmed through a molecular weight distribution curve (indicated by a continuous solid line in FIG. 1) using gel permeation chromatography (GPC).

The gel permeation chromatography used in the measurement of the molecular weight distribution curve graph is measured, for example, using Polymer Laboratories PLgel MIX-B, 300 mm column, a Waters PL-GPC220 instrument wherein an evaluation temperature is 100° C. to 200° C., 1,2,4-trichlorobenzene is used as a solvent, the flow rate is from 0.1 mL/min to 10 mL/min, and a sample having a concentration of 1 mg/10 mL to 20 mg/10 mL can be used under the condition of being supplied in an amount of 100 μL to 300 μL.

On the other hand, the side chain branch content of 2 to 7 carbon atoms per 1000 carbon atoms that each of the plurality of polymer chains contained in the polyethylene copolymer has can be confirmed by analyzing the polyethylene copolymer with FT-IR.

The FT-IR used for the measurement of the short chain branch (SCB) is measured, for example, using a PerkinElmer Spectrum 100 instrument including a DTGS detector, wherein the evaluation temperature is 100° C. to 200° C., a wavenumber is 2000 $cm^{-1}$ to 4000 $cm^{-1}$, the number of scans is 1 to 20, and the resolution is 1 $cm^{-1}$ to 10 $cm^{-1}$.

When the SCG index of the polyethylene copolymer of the above embodiment exceeds the value of (carbon number of the alpha olefin)$^{1/2}$×5 and does not satisfy Equation 1, there is a limit in that, as the melt index of the polyethylene copolymer increases or the comonomer distribution index (CDI) decreases, the processability and long-term durability are reduced.

Specifically, the polyethylene copolymer may have an SCG index of 11 or less, 5 to 11, 5 to 10, or 5 to 9.6, and the polyethylene copolymer may have a comonomer distribution index (CDI) of 1.2 to 3.0, 1.2 to 2.6, or 1.23 to 2.56.

Thus, the polyethylene copolymer may have an S.H. modulus (measured at 80° C.) of 0.85 MPa or more, 0.85 MPa to 1.0 MPa, or 0.90 MPa to 0.97 MPa. In addition, the polyethylene copolymer may have stress crack resistance (Full Notch Creep Test (FNCT), measured at 4 MPa) of 1000 h or more, or 1000 h to 10,000 h.

Thus, it can be confirmed that the polyethylene copolymer has a high S.H. modulus and stress crack resistance (FNCT), and thereby has excellent long-term brittle fracture resistance.

The polyethylene copolymer has a melt index (measured at 190° C. under a load of 2.16 kg according to ASTM D1238) of 0.01 g/10 min to 0.65 g/10 min, 0.02 g/10 min to 0.60 g/10 min, 0.03 g/10 min to 0.60 g/10 min, or 0.036 g/10 min to 0.591 g/10 min. Further, the polyethylene copolymer has a melt index (measured at 190° C. under a load of 21.6 kg according to ASTM D1238) of 2 g/10 min to 30 g/10 min, 9 g/10 min to 25 g/10 min, or 9.5 g/10 min to 24.5 g/10 min.

The polyethylene copolymer may have a density (ASTM 1505) of 0.930 $g/cm^3$ to 0.945 $g/cm^3$, or 0.935 $g/cm^3$ to 0.940 $g/cm^3$.

The average value of the side chain branch content (measured by FT-IR) of 2 to 7 carbon atoms per 1000 carbon atoms that each of the plurality of polymer chains contained in the polyethylene copolymer has is characterized by being 7/1000 C to 15/1000 C, 7/1000 C to 14/1000 C, 7/1000 C to 13/1000 C, 7/1000 C to 12/1000 C, or 7/1000 C to 11/1000 C.

The average value of the side chain branch content of 2 to 7 carbon atoms per 1000 carbon atoms that each of the plurality of polymer chains contained in the polyethylene copolymer has can be calculated by dividing the total side chain branch content of 2 to 7 carbon atoms per 1000 carbon atoms that each of the plurality of polymer chains contained in the polyethylene copolymer has by the number of the polymer chains contained in the polyethylene copolymer.

Alternatively, the average value of the side chain branch content of 2 to 7 carbon atoms per 1000 carbon atoms that each of the plurality of polymer chains contained in the polyethylene copolymer has can be obtained according to the above-described average value calculation method after deriving the SCB distribution curve (indicated by a discontinuous dashed line in FIG. 1) wherein the log value (log M) of the molecular weight (M) obtained by gel permeation chromatography is taken as the x-axis, and the side chain branch content of 2 to 7 carbon atoms per 1000 carbon atoms relative to the log value obtained by FT-IR is taken as the y-axis.

That is, for the polyethylene copolymer, the value obtained by averaging the side chain branch content of 2 to 7 carbon atoms per 1000 carbon atoms of each polymer chain with respect to all polymer chains having various molecular weights measured by gel permeation chromatography (GPC) can displayed as high as 7/1000 C to 15/1000 C, 7/1000 C to 14/1000 C, 7/1000 C to 13/1000 C, 7/1000 C to 12/1000 C, or 7/1000 C to 11/1000 C.

As the average value of the side chain branch (SCB) content (measured by FT-IR) of 2 to 7 carbon atoms per 1000 carbon atoms that each of the plurality of polymer chains of the polyethylene copolymer has is increased to 7/1000 C or more, tie molecules such as short chain branches (SCB) are concentrated in the high molecular weight portion which is relatively more responsible for physical properties than the low molecular weight portion, thereby realizing excellent physical properties as compared with conventional ones.

The polyethylene copolymer may have at least one of the above-mentioned physical properties, and it can have all of the above-mentioned physical properties in order to exhibit excellent mechanical strength. In this case, the effect of improving the mechanical strength and processability can be more remarkable, together with excellent long-term durability.

The above-mentioned polyethylene copolymer can be prepared by the preparation method including a step of polymerizing an ethylene monomer and an alpha olefin monomer in the presence of a hybrid supported catalyst which includes: a transition metal mixture including a first mixture including a first transition metal compound containing at least one selected from the group consisting of the following Chemical Formulas 2 and 3, and a second transition metal compound containing at least one selected from the group consisting of the following Chemical Formulas 4 to 7, or a second mixture including a first transition metal compound containing the following Chemical Formula 1, and a second transition metal compound containing at least one selected from the group consisting of the following Chemical Formulas 4, 6, and 7; and a support on which the transition metal mixtures are supported.

[Chemical Formula 1]

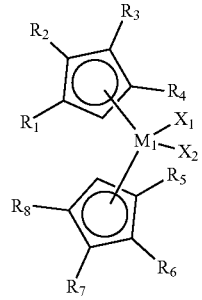

In Chemical Formula 1, $M_1$ is a Group 4 transition metal;

at least one of $R_1$ to $R_8$ is —$(CH_2)_n$—$OR_a$ (where $R_a$ is a $C_{1-6}$ linear or branched alkyl group, and n is an integer of 2 to 10), and the rest are the same as or different from each other and are each independently hydrogen, a $C_{1-20}$ alkyl, a $C_{2-20}$ alkenyl, a $C_{3-20}$ cycloalkyl, a $C_{6-20}$ aryl, a $C_{7-20}$ alkylaryl, or a $C_{7-20}$ arylalkyl, or two or more adjacent groups are connected to each other to form a substituted or unsubstituted aliphatic or aromatic ring, and $X_1$ and $X_2$ are the same as or different from each other, and are each independently a halogen, a $C_{1-20}$ alkyl, a $C_{2-10}$ alkenyl, a $C_{3-20}$ cycloalkyl, a $C_{7-40}$ alkylaryl, a $C_{7-40}$ arylalkyl, a $C_{6-20}$ aryl, a $C_{1-20}$ alkylidene, an amino, a $C_{2-20}$ alkylalkoxy, or a $C_{7-40}$ arylalkoxy.

[Chemical Formula 2]

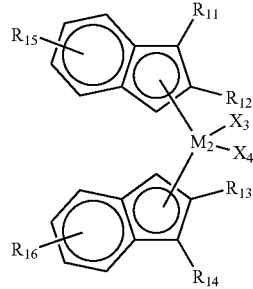

In Chemical Formula 2, $M_2$ is a Group 4 transition metal;

$X_3$ and $X_4$ are the same as or different from each other and are each independently a halogen, a $C_{1-20}$ alkyl, a $C_{2-10}$ alkenyl, a $C_{3-20}$ cycloalkyl, a $C_{7-40}$ alkylaryl, a $C_{7-40}$ arylalkyl, a $C_{6-20}$ aryl, a $C_{1-20}$ alkylidene, an amino, a $C_{2-20}$ alkylalkoxy, or a $C_{7-40}$ arylalkoxy;

at least one of $R_{11}$ to $R_{14}$ is —$(CH_2)_m$—$OR_b$ (where $R_b$ is a $C_{1-6}$ linear or branched alkyl group, and m is an integer of 2 to 10), and the rest are the same as or different from each other, and are each independently hydrogen, a $C_{1-20}$ alkyl, a $C_{2-20}$ alkenyl, a $C_{3-20}$ cycloalkyl, a $C_{6-20}$ aryl, a $C_{7-20}$ alkylaryl, or a $C_{7-20}$ arylalkyl, or two or more adjacent groups are connected to each other to form a substituted or unsubstituted aliphatic or aromatic ring, $R_3$ and $R_4$ are the same as or different from each other, and are each independently hydrogen, a $C_{1-20}$alkyl, a $C_{3-20}$ cycloalkyl, a $C_{1-10}$ alkoxy, a $C_{2-20}$ alkoxyalkyl, a $C_{6-20}$ aryl, a $C_{6-10}$ aryloxy, a $C_{2-20}$ alkenyl, a $C_{7-40}$ alkylaryl, a $C_{7-40}$ arylalkyl, a $C_{8-40}$ arylalkenyl, or a $C_{2-10}$ alkynyl; and $X_{31}$ and $X_{32}$ are the same as or different from each other, and are each independently a halogen, a $C_{1-20}$ alkyl, a $C_{2-10}$ alkenyl, a $C_{3-20}$ cycloalkyl, a $C_{7-40}$ alkylaryl, a $C_{7-40}$ arylalkyl, a $C_{6-20}$ aryl, a $C_{1-20}$ alkylidene, an amino, a $C_{2-20}$ alkyl alkoxy, or a $C_{7-40}$ arylalkoxy.

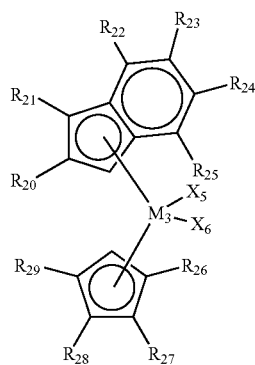

[Chemical Formula 3]

In Chemical Formula 3, $M_3$ is a Group 4 transition metal;

$X_5$ and $X_6$ are the same as or different from each other and are each independently a halogen, a $C_{1-20}$ alkyl, a $C_{2-10}$ alkenyl, a $C_{3-20}$ cycloalkyl, a $C_{7-40}$ alkylaryl, a $C_{7-40}$ arylalkyl, a $C_{6-20}$ aryl, a $C_{1-20}$ alkylidene, an amino, a $C_{2-20}$ alkylalkoxy, or a $C_{7-40}$ arylalkoxy; and $R_{20}$ to $R_{29}$ are the same as or different from each other, and are each independently hydrogen, a $C_{1-20}$ alkyl, a $C_{3-20}$ cycloalkyl, a $C_{1-10}$ alkoxy, a $C_{2-20}$ alkoxyalkyl, a $C_{6-20}$ aryl, a $C_{6-10}$ aryloxy, a $C_{2-20}$ alkenyl, a $C_{7-40}$ alkylaryl, a $C_{7-40}$ arylalkyl, a $C_{8-40}$ arylalkenyl, or a $C_{2-10}$ alkynyl, provided that at least one of $R_{20}$ to $R_{29}$ is $-(CH_2)_p-OR_c$ (where $R_c$ is a $C_{1-6}$ linear or branched alkyl group, and p is an integer of 2 to 10).

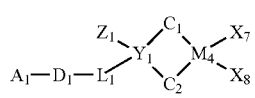

[Chemical Formula 4]

In Chemical Formula 4, $A_1$ is hydrogen, a halogen, a $C_{1-20}$ alkyl group, a $C_{2-20}$ alkenyl group, a $C_{6-20}$ aryl group, a $C_{7-20}$ alkylaryl group, a $C_{7-20}$ arylalkyl group, a $C_{1-20}$ alkoxy group, a $C_{2-20}$ alkoxyalkyl group, a $C_{3-20}$ heterocycloalkyl group, or a $C_{5-20}$ heteroaryl group;

$D_1$ is $-O-$, $-S-$, $-N(R)-$, or $-Si(R)(R')-$, wherein R and R' are the same as or different from each other and are each independently hydrogen, a halogen, a $C_{1-20}$ alkyl group, a $C_{2-20}$ alkenyl group, or a $C_{6-20}$ aryl group;

$L_1$ is $C_{1-10}$ linear or branched alkylene group;

$Y_1$ is carbon, silicon, or germanium;

$Z_1$ is hydrogen, a halogen, a $C_{1-20}$ alkyl group, a $C_{2-20}$ alkenyl group, a $C_{6-20}$ aryl group, a $C_{7-20}$ alkylaryl group, or a $C_{7-20}$ arylalkyl group;

$M_4$ is a Group 4 transition metal;

$X_7$ and $X_8$ are the same as or different from each other, and are each independently a halogen, a $C_{1-20}$ alkyl, a $C_{2-10}$ alkenyl, a $C_{3-20}$ cycloalkyl, a $C_{7-40}$ alkylaryl, a $C_{7-40}$ aryl- alkyl, a $C_{6-20}$ aryl, a $C_{1-20}$ alkylidene, an amino, a $C_{2-20}$ alkylalkoxy, or a $C_{7-40}$ arylalkoxy, $C_2$ is $-NR_{36}-$, and $C_1$ is represented by the following Chemical Formula 4a,

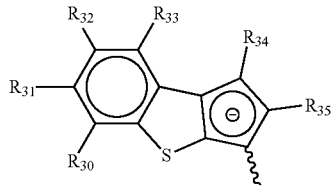

[Chemical Formula 4a]

Herein, $R_{30}$ to $R_{36}$ are the same as or different from each other and are each independently hydrogen, a halogen, a $C_{1-20}$ alkyl group, a $C_{2-20}$ alkenyl group, a $C_{1-20}$ alkylsilyl group, a $C_{1-20}$ silylalkyl group, a $C_{1-20}$ alkoxysilyl group, a $C_{1-20}$ alkoxy group, a $C_{6-20}$ aryl group, a $C_{7-20}$ alkylaryl group, or a $C_{7-20}$ arylalkyl group, and two or more adjacent groups of $R_{30}$ to $R_{35}$ may be connected to each other to form a substituted or unsubstituted aliphatic or aromatic ring.

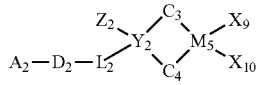

[Chemical Formula 5]

In Chemical Formula 5, $A_2$ is hydrogen, a halogen, a $C_{1-20}$ alkyl group, a $C_{2-20}$ alkenyl group, a $C_{6-20}$ aryl group, a $C_{7-20}$ alkylaryl group, a $C_{7-20}$ arylalkyl group, a $C_{1-20}$ alkoxy group, a $C_{2-20}$ alkoxyalkyl group, a $C_{3-20}$ heterocycloalkyl group, or a $C_{5-20}$ heteroaryl group;

$D_2$ is $-O-$, $-S-$, $-N(R)-$, or $-Si(R)(R')-$, wherein R and R' are the same as or different from each other, and are each independently hydrogen, a halogen, a $C_{1-20}$ alkyl group, a $C_{2-20}$ alkenyl group, or a $C_{6-20}$ aryl group;

$L_2$ is $C_{1-10}$ linear or branched alkylene group;

$Y_2$ is carbon, silicon, or germanium;

$Z_2$ is hydrogen, a halogen, a $C_{1-20}$ alkyl group, a $C_{2-20}$ alkenyl group, a $C_{6-20}$ aryl group, a $C_{7-20}$ alkylaryl group, or a $C_{7-20}$ arylalkyl group;

$M_5$ is a Group 4 transition metal;

$X_9$ and $X_{10}$ are the same as or different from each other and are each independently a halogen, a $C_{1-20}$ alkyl, a $C_{2-10}$ alkenyl, a $C_{3-20}$ cycloalkyl, a $C_{7-40}$ alkylaryl, a $C_{7-40}$ aryl- alkyl, a $C_{6-20}$ aryl, a $C_{1-20}$ alkylidene, an amino, a $C_{2-20}$ alkylalkoxy, or a $C_{7-40}$ arylalkoxy;

$C_4$ is $-NR_{44}-$, and $C_3$ is represented by the following Chemical Formula 5a,

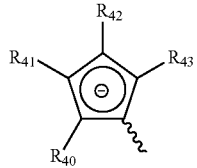

[Chemical Formula 5a]

Herein, $R_{40}$ to $R_{44}$ are the same as or different from each other, and are each independently hydrogen, a halogen, a $C_{1-20}$ alkyl group, a $C_{2-20}$ alkenyl group, a $C_{1-20}$ alkylsilyl group, a $C_{1-20}$ silylalkyl group, a $C_{1-20}$ alkoxysilyl group, a $C_{1-20}$ alkoxy group, a $C_{6-20}$ aryl group, a $C_{7-20}$ alkylaryl group, or a $C_{7-20}$ arylalkyl group, and two or more adjacent groups of $R_{40}$ to $R_{43}$ may be connected to each other to form a substituted or unsubstituted aliphatic or aromatic ring.

[Chemical Formula 6]

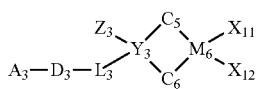

In Chemical Formula 6, $A_3$ is hydrogen, a halogen, a $C_{1-20}$ alkyl group, a $C_{2-20}$ alkenyl group, a $C_{6-20}$ aryl group, a $C_{7-20}$ alkylaryl group, a $C_{7-20}$ arylalkyl, a $C_{1-20}$ alkoxy group, a $C_{2-20}$ alkoxyalkyl group, a $C_{3-20}$ heterocycloalkyl group, or a $C_{5-20}$ heteroaryl group;

$D_3$ is —O—, —S—, —N(R)—, or —Si(R)(R')—, wherein R and R' are the same as or different from each other, and are each independently hydrogen, a halogen, a $C_{1-20}$alkyl group, a $C_{2-20}$ alkenyl group, or a $C_{6-20}$ aryl group;

$L_3$ is a $C_{1-10}$ linear or branched alkylene group;

$Y_3$ is carbon, silicon, or germanium;

$Z_3$ is hydrogen, a halogen, a $C_{1-20}$ alkyl group, a $C_{2-20}$ alkenyl group, a $C_{6-20}$ aryl group, a $C_{7-20}$ alkylaryl group, or a $C_{7-20}$ arylalkyl group;

$M_6$ is a Group 4 transition metal;

$X_{11}$ and $X_{12}$ are the same as or different from each other, and are each independently a halogen, a $C_{1-20}$ alkyl, a $C_{2-20}$ alkenyl, a $C_{3-20}$ cycloalkyl, a $C_{7-40}$ alkylaryl, a $C_{7-40}$ arylalkyl, a $C_{6-20}$ aryl, a $C_{1-20}$ alkylidene, an amino, a $C_{2-20}$ alkylalkoxy, or a $C_{7-40}$ arylalkoxy; and $C_5$ and $C_6$ are the same as or different from each other, and are each independently represented by one of the following Chemical Formulas 6a to 6b,

[Chemical Formulas 6a]

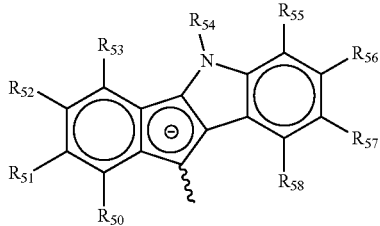

[Chemical Formulas 6b]

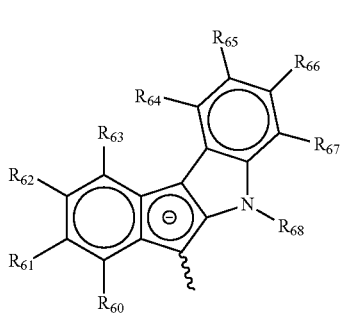

Herein, $R_{50}$ to $R_{58}$, and $R_{60}$ to $R_{68}$, are the same as or different from each other, and are each independently hydrogen, a halogen, a $C_{1-20}$ alkyl group, a $C_{2-20}$ alkenyl group, a $C_{1-20}$ alkylsilyl group, a $C_{1-20}$ silylalkyl group, a $C_{1-20}$ alkoxysilyl group, a $C_{1-20}$ alkoxy group, a $C_{6-20}$ aryl group, a $C_{7-20}$ alkylaryl group, or a $C_{7-20}$ arylalkyl group, and two or more adjacent groups of $R_{50}$ to $R_{58}$ and $R_{60}$ to $R_{68}$ may be connected to each other to form a substituted or unsubstituted aliphatic or aromatic ring.

[Chemical Formula 7]

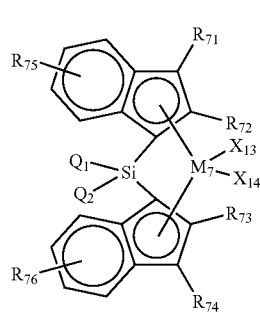

In Chemical Formula 7, $M_7$ is a Group 4 transition metal;

$X_{13}$ and $X_{14}$ are the same as or different from each other, and are each independently a halogen, a $C_{1-20}$ alkyl, a $C_{2-10}$ alkenyl, a $C_{3-20}$ cycloalkyl, a $C_{7-40}$ alkylaryl, a $C_{7-40}$ arylalkyl, a $C_{6-20}$ aryl, a $C_{1-20}$ alkylidene, an amino, a $C_{2-20}$ alkylalkoxy, or a $C_{7-40}$ arylalkoxy;

at least one of $R_{71}$ to $R_{74}$ is —$(CH_2)_q$—$OR_d$ (where $R_d$ is a $C_{1-6}$ linear or branched alkyl group, and q is an integer of 2 to 10), and the rest are the same as or different from each other, and are each independently hydrogen, a $C_{1-20}$ alkyl, a $C_{2-20}$ alkenyl, a $C_{3-20}$ cycloalkyl, a $C_{6-20}$ aryl, a $C_{7-20}$ alkylaryl, or a $C_{7-20}$ arylalkyl, or two or more adjacent groups are connected to each other to form a substituted or unsubstituted aliphatic or aromatic ring;

$R_{75}$ and $R_{76}$ are the same as or different from each other, and are each independently hydrogen, a $C_{1-20}$alkyl, a $C_{3-20}$ cycloalkyl, a $C_{1-10}$ alkoxy, a $C_{2-20}$ alkoxyalkyl, a $C_{6-20}$ aryl, a $C_{6-10}$ aryloxy, a $C_{2-20}$ alkenyl, a $C_{7-40}$ alkylaryl, a $C_{7-40}$ arylalkyl, a $C_{8-40}$ arylalkenyl, or a $C_{2-10}$ alkynyl;

$X_{13}$ and $X_{14}$ are the same as or different from each other, and are each independently a halogen, a $C_{1-20}$ alkyl, a $C_{2-10}$ alkenyl, a $C_{3-20}$ cycloalkyl, a $C_{7-40}$ alkylaryl, a $C_{7-40}$ arylalkyl, a $C_{6-20}$ aryl, a $C_{1-20}$ alkylidene, an amino, a $C_{2-20}$ alkylalkoxy, or a $C_{7-40}$ arylalkoxy; and $Q_1$ and $Q_2$ are the same as or different from each other, and are each independently hydrogen, a halogen, a $C_{1-20}$ alkyl, a $C_{2-20}$ alkenyl, a $C_{3-20}$ cycloalkyl, a $C_{6-20}$ aryl, a $C_{7-20}$ alkylaryl, or a $C_{7-20}$ arylalkyl.

The $C_{1-20}$ alkyl includes a linear or branched alkyl, and specific examples thereof include methyl, ethyl, propyl, isopropyl, n-butyl, tert-butyl, pentyl, hexyl, heptyl, octyl, and the like, but are not limited thereto.

The $C_{2-20}$ alkenyl includes a linear or branched alkenyl, and specific examples thereof include allyl, ethenyl, propenyl, butenyl, pentenyl, and the like, but are not limited thereto.

The $C_{3-20}$ cycloalkyl includes a monocyclic or fused ring-type cycloalkyl, and specific examples thereof include cyclopropyl, cyclobutyl, cyclopentyl, cyclohexyl, norbornyl, and the like, but are not limited thereto.

The C$_{6-20}$ aryl includes a monocyclic or fused ring-type aryl, and specific examples thereof include phenyl, biphenyl, naphthyl, phenanthrenyl, fluorenyl, and the like, but are not limited thereto.

The C$_{5-20}$ heteroaryl includes a monocyclic or fused ring-type heteroaryl, and specific examples thereof include carbazolyl, pyridyl, quinoline, isoquinoline, thiophenyl, furanyl, imidazole, oxazolyl, thiazolyl, triazine, tetrahydropyranyl, tetrahydrofuranyl, and the like, but are not limited thereto.

Examples of the C$_{1-20}$ alkoxy include methoxy, ethoxy, phenyloxy, cyclohexyloxy, and the like, but are not limited thereto.

Examples of the Group 4 transition metal include titanium, zirconium, hafnium, and the like, but are not limited thereto.

Two or more adjacent groups being connected to each other to form a substituted or unsubstituted aliphatic or aromatic ring means that atoms(s) of two substituents and atom (atoms) to which the two substituents are bonded are connected to each other to form a ring.

The above-mentioned substituents may optionally be substituted with a hydroxyl group; a halogen; a hydrocarbyl group; a hydrocarbyloxy group; a hydrocarbyl group or a hydrocarbyloxy group containing one or more heteroatoms from Groups 14-16; —SiH$_3$; a hydrocarbyl(oxy)silyl group; a phosphine group; a phosphide group; a sulfonate group; and a sulfone group, within the range that exhibits the same or similar effect as the desired effect.

In the hybrid supported catalyst usable in the preparation of the polyethylene copolymer according to one embodiment of the present invention, the first transition metal compound containing at least one selected from the group consisting of Chemical Formulas 1 to 3 may contribute mainly to the preparation of a low molecular weight copolymer having a low SCB (short chain branch) content, and the second transition metal compound containing at least one selected from the group consisting of Chemical Formulas 4 to 7 may contribute mainly to the preparation of a high molecular weight copolymer having a high SCB content.

The first transition metal compound represented by Chemical Formula 1 contributes mainly to the preparation of a low molecular weight copolymer having a low SCB (short chain branch) content, and specific examples thereof include compounds represented by the structural formulas shown below, but the present invention is not limited thereto.

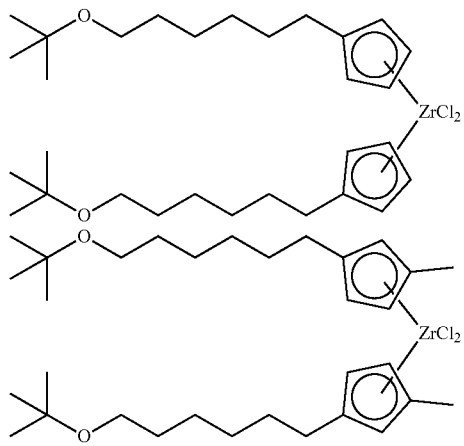

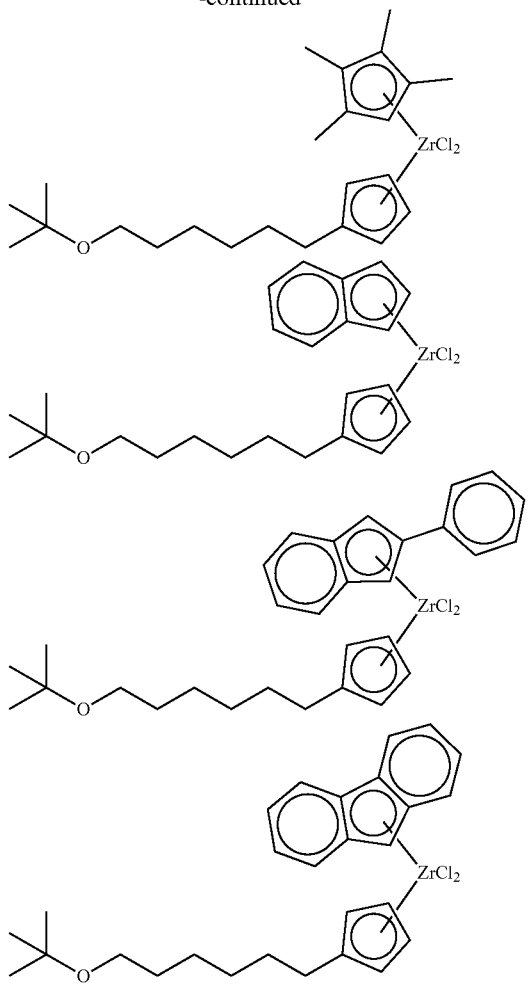

Further, in Chemical Formula 1, by introducing (CH$_2$)$_n$—OR$_a$ (where R$_a$ is a C$_{1-6}$ linear or branched alkyl group and n is an integer of 2 to 10), more specifically a t-butoxyhexyl group, in any one of R$_1$ to R$_4$ and any one of R$_5$ to R$_8$ as a substituent of the cyclopentadienyl group, it exhibits a low conversion rate at the time of producing a polyolefin using a comonomer, and can produce a low molecular weight polyolefin with a controlled degree of copolymerization or comonomer distribution.

More specifically, the first metallocene compound represented by Chemical Formula 1, which has excellent activity, and in particular, can further improve the comonomer incorporation of 1-octene, 1-butene, or 1-hexene, may be a compound represented by the structural formula shown below.

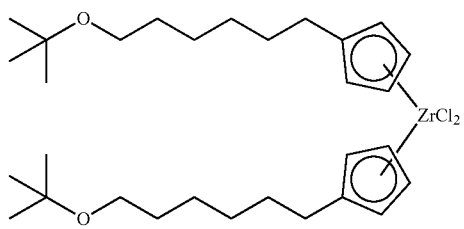

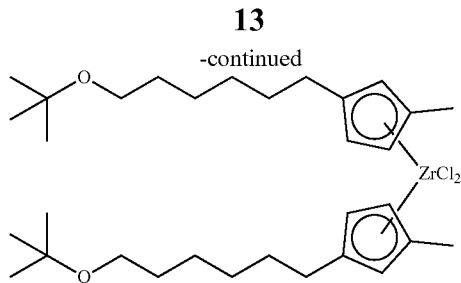

On the other hand, the first transition metal compound of Chemical Formula 2 has a structure in which two indene groups are crosslinked by an $M_2X_3X_4$ bridge, wherein the substituent of any one or more of the substituents $R_{11}$ to $R_{14}$ of the indene group is $—(CH_2)_m—OR_b$, and each indene group may be substituted with $R_{15}$ and $R_{16}$.

As described above, in the first transition metal compound of Chemical Formula 2, at least one, more particularly two or more, of tether groups of the formula $—(CH_2)_m—OR_b$ (where $R_b$ is a $C_{1-6}$ linear or branched alkyl group, and m is an integer of 2 to 10) are introduced in a substituent of indene or its derivative, and thereby, it exhibits a low conversion rate at the time of producing a polyolefin using a comonomer, as compared with another Cp-based catalyst not containing the substituent, and can produce a medium- and low-molecular weight polyolefin with a controlled degree of copolymerization or comonomer distribution.

Specifically, any one or more of $R_{11}$ to $R_{14}$ in Chemical Formula 2 has the feature of $—(CH_2)_m—OR_b$ (where $R_b$ is a $C_{1-6}$ linear or branched alkyl group, and m is an integer of 2 to 10). In Chemical Formula 2, $—(CH_2)_m—OR_b$ may specifically be a tert-butoxybutyl or a tert-butoxyhexyl. More specifically, two indene groups may each include a $—(CH_2)_m—OR_b$ group, and the $—(CH_2)_m—OR_b$ group may be a tert-butoxybutyl group or a tert-butoxyhexyl group. When the transition metal compound having such a structure is supported on a support, the $—(CH_2)_m—OR_b$ group can form a covalent bond through close interaction with a silanol group on the silica surface used as the support and thus stable supported polymerization is possible. In addition, the functional group may affect the comonomer incorporation of alpha olefin comonomers such as 1-octene, 1-butene, or 1-hexene. In the case of $—(CH_2)_m—OR_b$ wherein m has a short alkyl chain of 10 or less, more particularly 6 or less, and still more particularly 4 or less, the comonomer incorporation to alpha-olefin comonomers is lowered while maintaining the overall polymerization activity, which is advantageous for the preparation of a polyethylene copolymer having controlled copolymerization without deteriorating other physical properties.

The first transition metal compound represented by Chemical Formula 2 may be, for example, a compound represented by one of the structural formulas shown below, but is not limited thereto.

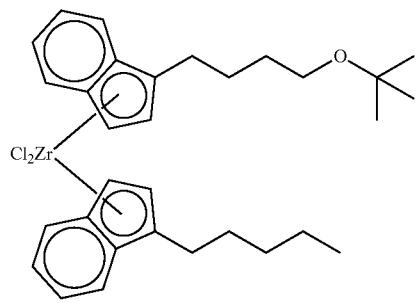

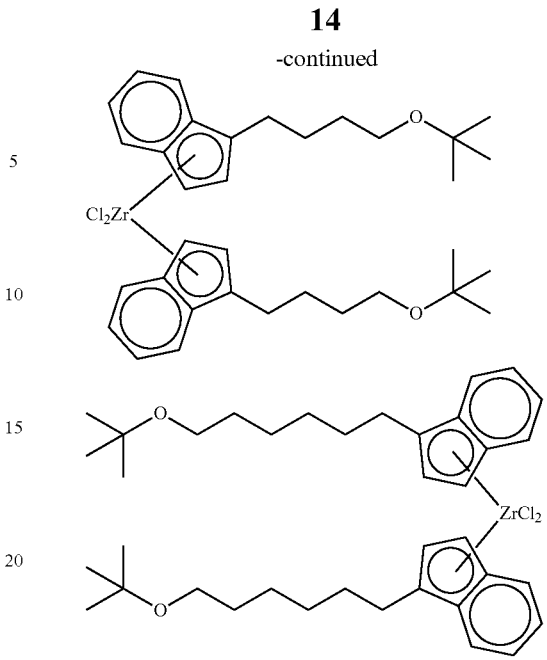

In addition, the first transition metal compound represented by Chemical Formula 3 is a structure wherein an indene group and cyclopentadiene (Cp) are non-crosslinked, which can easily control the electronic/three-dimensional environment around the transition metal. As a result, the characteristics such as chemical structure, molecular weight distribution, and mechanical properties of the synthesized polyethylene copolymer can be easily controlled. Further, a substituent group of $—(CH_2)_p—OR_c$ (where $R_c$ is a $C_{1-6}$ linear or branched alkyl group, and p is an integer of 2 to 10) are introduced in any one substituent of the indene group or the cyclopentadiene gorup, and thereby, it exhibits a low conversion rate at the time of producing a polyolefin using a comonomer, as compared with another Cp-based catalyst not containing the substituent, and thus can produce a low molecular weight polyolefin with a controlled degree of copolymerization or comonomer distribution. Further, when the transition metal compound having such a structure is supported on a support, the $—(CH_2)_n—OR$ group among the substituents can form a covalent bond through close interaction with a silanol group on the silica surface used as the support, and thus stable supported polymerization is possible.

In Chemical Formula 3, $M_3$ is a Group 4 transition metal. Specifically, it may be Ti, Zr, or Hf, and more specifically Ti or Zr.

Further, in Chemical Formula 3, $R_{20}$ to $R_{29}$ are specifically the same as or different from each other, and are each independently selected from the group consisting of hydrogen, an alkyl group having 1 to 20 carbon atoms, an alkenyl group having 2 to 20 carbon atoms, an aryl group having 6 to 20 carbon atoms, an alkylaryl group having 7 to 20 carbon atoms, and an arylalkyl group having 7 to 20 carbon atoms, provided that at least one of $R_{20}$ to $R_{29}$ may be $—(CH_2)_p—OR_c$ (where $R_c$ is a linear or branched alkyl group having 1 to 6 carbon atoms and p is an integer of 2 to 10). Further, the $—(CH_2)_p—OR_c$ functional group may affect the comonomer incorporation of alpha olefin comonomers such as 1-butene or 1-hexene. When p has a short alkyl chain of 4 or less, the comonomer incorporation to alpha-olefin comonomers is lowered while maintaining the overall polymerization activity, and can produce a polyethylene copolymer having controlled copolymerization without deteriorating other physical properties. Consequently, in Chemical Formula 3, any one or more substituents of $R_{20}$ and $R_{21}$, or any one or more substituents of $R_{26}$ to $R_{29}$ of the cyclopentadiene (Cp) may be —$(CH_2)_p$—$OR_c$ (where $R_c$ is a linear or branched alkyl group having from 1 to 6 carbon atoms and p is an integer of 2 to 10). More specifically, any one or more substituents of $R_{20}$ and $R_{21}$ may be —$(CH_2)_p$—$OR_c$ (where $R_c$ is a linear or branched alkyl group having 1 to 6 carbon atoms and p is an integer of 2 to 10).

Further, in Chemical Formula 3, $X_5$ and $X_6$ are the same as or different from each other and are each independently halogen, or an alkyl group having 1 to 20 carbon atoms.

Specific examples of the first transition metal compound represented by Chemical Formula 3 include compounds represented by the structural formulas shown below, but the present invention is not limited thereto.

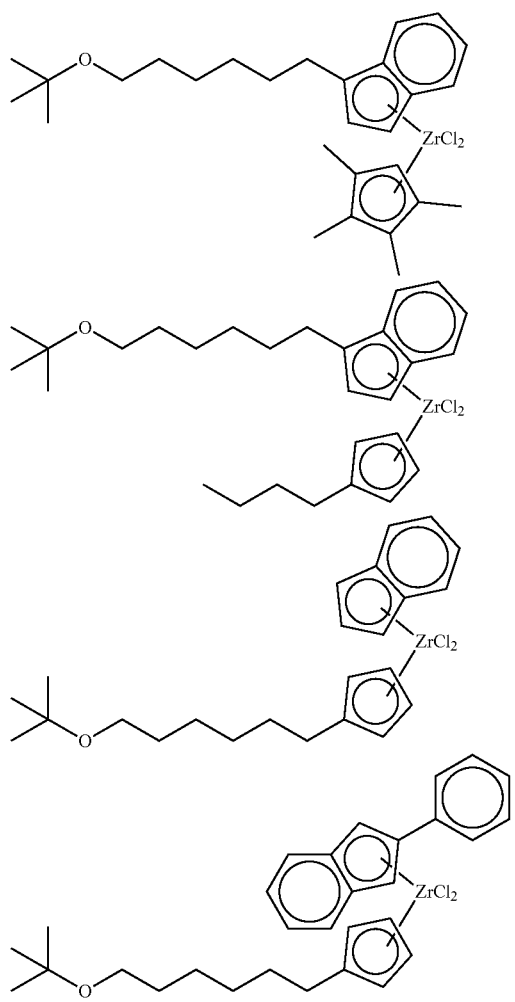

On the other hand, in the second transition metal compound represented by Chemical Formula 4, the transition metal compound represented by Chemical Formula 4 includes an aromatic cyclic compound containing thiophene as a different ligand and a base compound containing a Group 14 or Group 15 atom, and has a structure in which the different ligands are crosslinked by —$Y_1$— and $M_4(X_7)(X_8)$ exists between different ligands. The supported catalyst on which the transition metal compound having the specific structure is supported is applied to the polymerization reaction of the polyethylene copolymer and thus can provide a high molecular weight polyethylene copolymer exhibiting high activity.

Specifically, the ligand of $C_1$ in the structure of the transition metal compound represented by Chemical Formula 4 may affect, for example, the olefin polymerization activity and the olefin copolymerization properties. Specifically, as the ligand of $C_1$, $R_{30}$ to $R_{35}$ in Chemical Formula 4a are the same as or different from each other, and are each independently hydrogen or an alkyl group having 1 to 10 carbon atoms, $R_{30}$ to $R_{35}$ are the same as or different from each other, and more specifically include a ligand which is any one of alkyl groups having 1 to 10 carbon atoms. In this case, it is possible to provide a catalyst exhibiting excellent catalytic activity and a high comonomer conversion rate in the polyethylene copolymerization process.

In the structure of the transition metal compound represented by Chemical Formula 4, the $C_2$ ligand can also affect the polymerization activity of the olefin. In particular, when $C_2$ in Chemical Formula 4 is —$NR_{36}$— and $R_{36}$ is an alkyl group having 1 to 10 carbon atoms, it is possible to provide a catalyst exhibiting very high activity in the olefin polymerization process.

The ligand of $C_1$ and the ligand of $C_2$ may be bridged by —$Y_1$— to exhibit excellent support stability and polymerization activity. In Chemical Formula 4, $L_1$ is more preferably a $C_4$ to $C_8$ linear or branched alkylene group, but is not limited thereto. Further, the alkylene group may be substituted or unsubstituted with a $C_1$ to $C_{20}$ alkyl group, a $C_2$ to $C_{20}$ alkenyl group, or a $C_6$ to $C_{20}$ aryl group.

In addition, $Y_1$ in Chemical Formula 4 is preferably silicon, but is not limited thereto.

Further, in Chemical Formula 4, $A_1$ is hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tetrahydropyranyl group, or a tetrahydrofuranyl group, but is not limited thereto.

On the other hand, $M_4(X_7)(X_8)$ exists between the ligand of the bridged $C_1$ and the ligand of $C_2$, and the $M_4(X_7)(X_8)$ may affect the storage stability of the metal complex. In order to more effectively secure these effects, a transition metal compound in which $X_7$ and $X_8$ are each independently any one of halogens can be used.

Specific examples of the second transition metal compound represented by Chemical Formula 4 include compounds represented by the structural formulas shown below, but the present invention is not limited thereto.

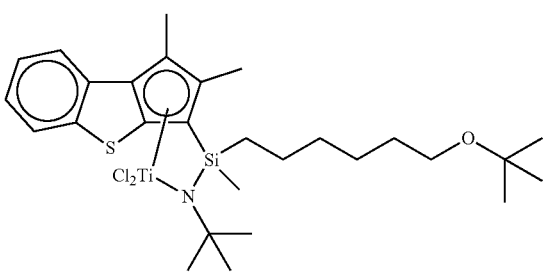

-continued

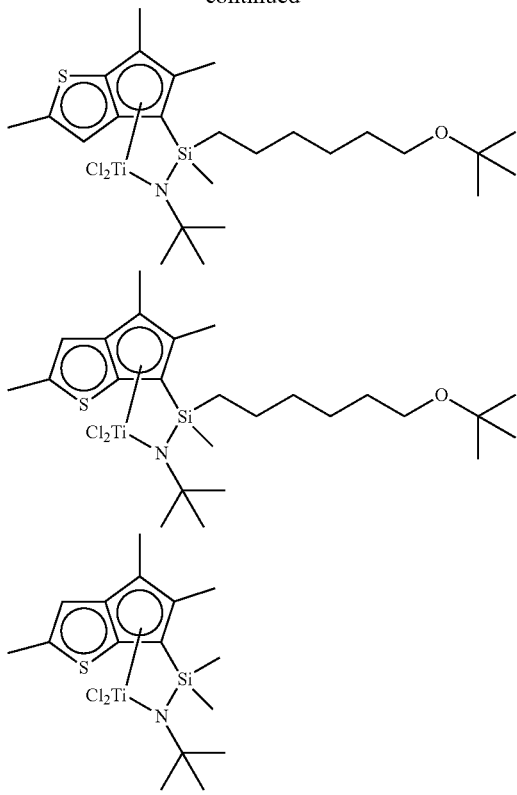

The transition metal compound represented by Chemical Formula 4 can be synthesized by applying known reactions. For more detailed synthesis methods, refer to examples described later.

On the other hand, in the second transition metal compound represented by Chemical Formula 5, the transition metal compound represented by Chemical Formula 5 includes a cyclic compound containing cyclopentadiene as a different ligand and a base compound containing a Group 14 or Group 15 atom, and has a structure in which the different ligands are crosslinked by —$Y_2$— and $M_5(X_9)(X_{10})$ exists between different ligands. The supported catalyst on which the transition metal compound having the specific structure is supported is applied to the polymerization reaction of the polyethylene copolymer, and thus can provide a high molecular weight polyethylene copolymer exhibiting high activity.

Specifically, the ligand of C3 in the structure of the transition metal compound represented by Formula 5 may affect, for example, the olefin polymerization activity and the copolymerization characteristics of the olefin. Specifically, as the ligand of $C_3$, $R_{40}$ to $R_{43}$ in Chemical Formula 5a are the same as or different from each other and are each independently hydrogen or an alkyl group having 1 to 10 carbon atoms, $R_{40}$ to $R_{43}$ are the same as or different from each other and more specifically include a ligand which is any one of alkyl groups having 1 to 10 carbon atoms. In this case, it is possible to provide a catalyst exhibiting excellent catalytic activity and a high comonomer conversion rate in the polyethylene copolymerization process.

Further, within the structure of the transition metal compound represented by Chemical Formula 5, the $C_4$ ligand may also affect the polymerization activity of the olefin. In particular, when $C_4$ in Chemical Formula 5 is —$NR_{44}$— and $R_{44}$ is an alkyl group having 1 to 10 carbon atoms, it is possible to provide a catalyst exhibiting very high activity in the olefin polymerization process.

The ligand of $C_3$ and the ligand of $C_4$ may be bridged by —$Y_2$— to exhibit excellent supporting stability and polymerization activity. In Chemical Formula 5, $L_2$ is preferably a C4 to C8 linear or branched alkylene group, but is not limited thereto. Further, the alkylene group may be substituted or unsubstituted with a C1 to C20 alkyl group, a C2 to C20 alkenyl group, or a C6 to C20 aryl group.

Further, in Chemical Formula 5, $Y_2$ is preferably silicon, but is not limited thereto.

Further, in Chemical Formula 5, $A_2$ is preferably hydrogen, a methyl group, an ethyl group, a propyl group, an isopropyl group, an n-butyl group, a tert-butyl group, a methoxymethyl group, a tert-butoxymethyl group, an ethoxyethyl group, a 1-methyl-1-methoxyethyl group, a tetrahydropyranyl group, or a tetrahydrofuranyl group, but it is not limited thereto.

On the other hand, $M_5(X_9)(X_{10})$ exists between the ligand of the bridged $C_3$ and the ligand of $C_4$, and the $M_5(X_9)(X_{10})$ may affect the storage stability of the metal complex. In order to more effectively secure these effects, a transition metal compound in which $X_9$ and $X_{10}$ are each independently any one of halogens can be used.

Specific examples of the second transition metal compound represented by Chemical Formula 5 include a compound represented by the structural formula shown below, but the present invention is not limited thereto.

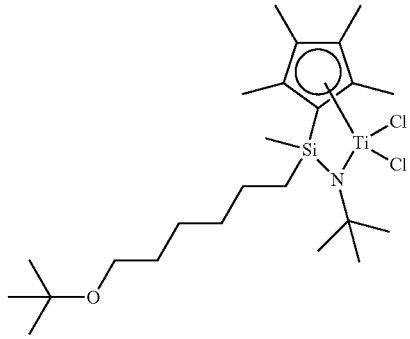

The transition metal compound represented by Chemical Formula 5 can be synthesized by applying known reactions. For more detailed synthesis method, refer to examples described later.

On the other hand, in Chemical Formula 6, $R_{50}$ to $R_{58}$, and $R_{60}$ to $R_{68}$ of Chemical Formulas 6a and 6b, are more preferably hydrogen, a methyl group, an ethyl gorup, a propyl group, an isopropyl group, an n-butyl group, a tert-butyl group, a pentyl group, a hexyl group, a heptyl group, an octyl group, a phenyl group, a halogen group, a trimethylsilyl group, a triethylsilyl group, a tripropylsilyl group, a tributylsilyl group, a triisopropylsilyl group, a trimethylsilylmethyl group, a methoxy group, or an ethoxy group, but are not limited thereto.

It is more preferable that $L_3$ in Chemical Formula 6 is a C4 to C8 linear or branched alkylene group, but is not limited thereto. Further, the alkylene group may be substituted or unsubstituted with a C1 to C20 alkyl group, a C2 to C20 alkenyl group, or a C6 to C20 aryl group.

Further, $A_3$ in Chemical Formula 6 is preferably hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tetrahydropyranyl group, or a tetrahydrofuranyl group, but it is not limited thereto.

In addition, $Y_3$ in Chemical Formula 6 is preferably silicon, but it is not limited thereto.

The second transition metal compound of Chemical Formula 6 forms a structure in which an indenoindole derivative and/or a fluorene derivative is crosslinked by a bridge, and has an unshared electron pair which can act as a Lewis base in the ligand structure. Thereby, it is supported on the surface having the Lewis acid characteristic of the support and exhibits high polymerization activity even when supported. Further, the second transition metal compound has high activity as it contains an electronically rich indenoindole group and/or fluorene group. Due to the appropriate steric hindrance and the electronic effect of the ligand, not only is the hydrogen reactivity low but also high activity is maintained even in the presence of hydrogen. In addition, the beta-hydrogen of the polymer chain in which the nitrogen atom of the indenoindole derivative grows is stabilized by hydrogen bonding to inhibit beta-hydrogen elimination, thereby polymerizing the ultrahigh molecular weight polyethylene copolymer.

According to an embodiment of the present invention, specific examples of the compound represented by Chemical Formula 6a include compounds represented by one of the structural formulas shown below, but the present invention is not limited thereto.

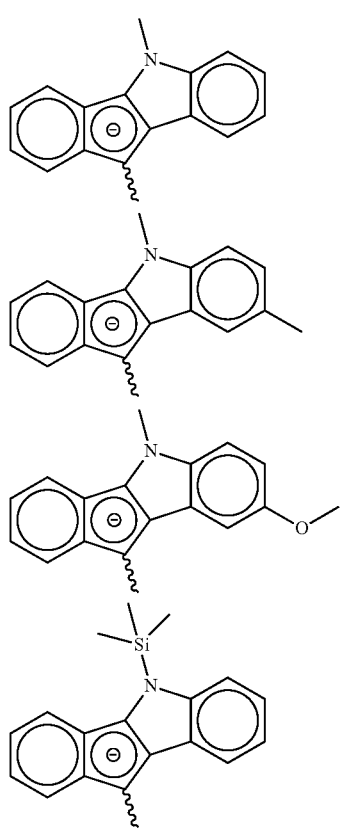

-continued

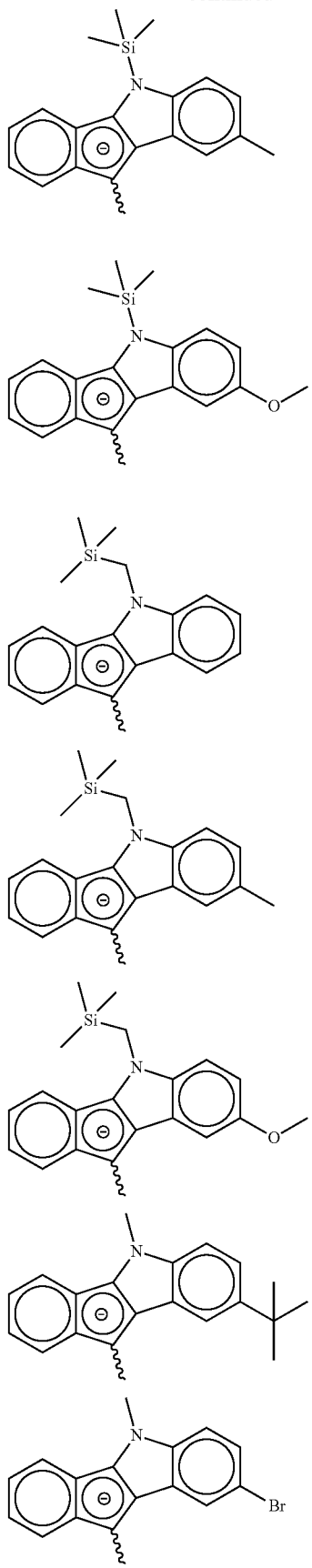

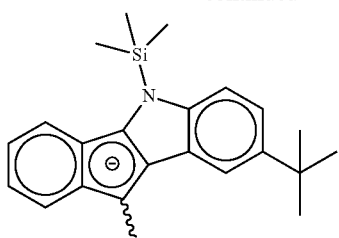
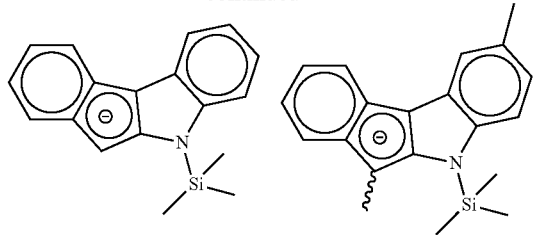
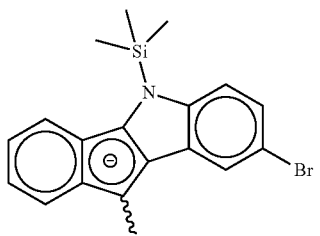
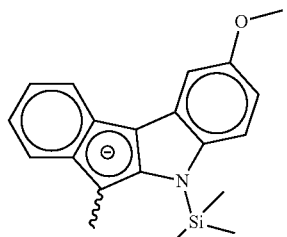
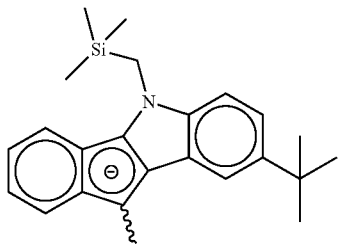
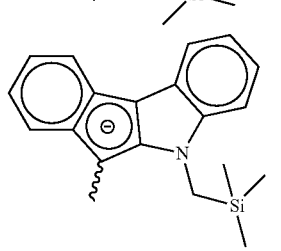
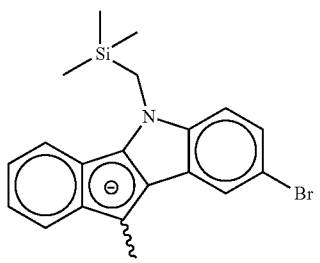
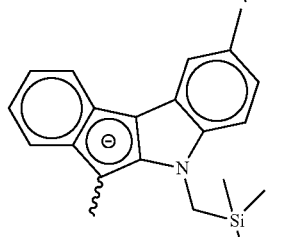
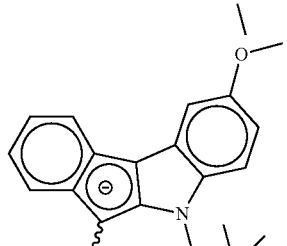
According to one embodiment of the present invention, specific examples of the compound represented by Chemical Formula 6b include compounds represented by one of the structural formulas shown below, but the present invention is not limited thereto.
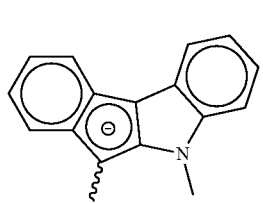 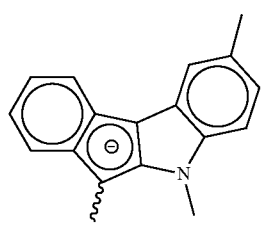
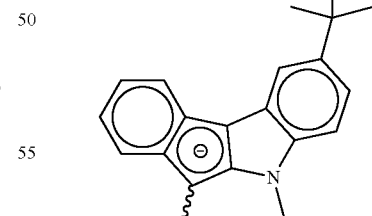
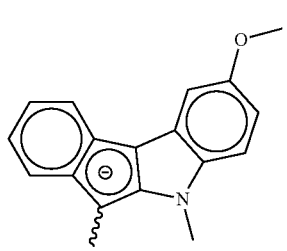
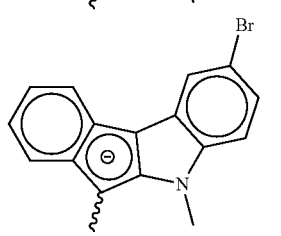

23
-continued
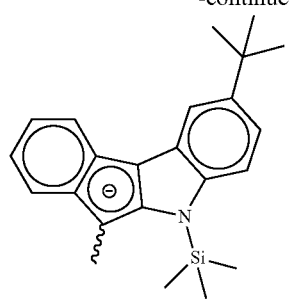
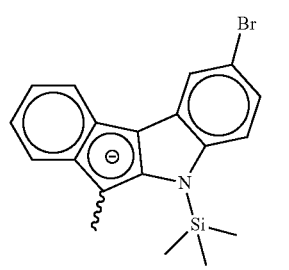
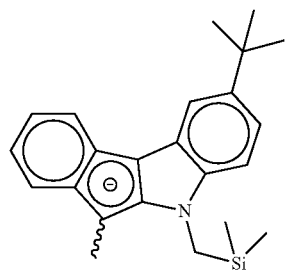
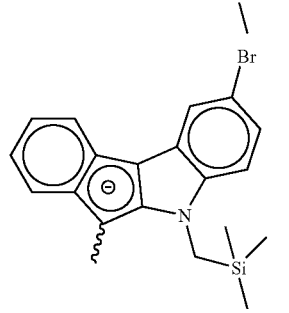
According to one embodiment of the present invention, specific examples of the second transition metal compound represented by Chemical Formula 6 include compounds represented by one of the structural formulas shown below, but are not limited thereto.
24
-continued
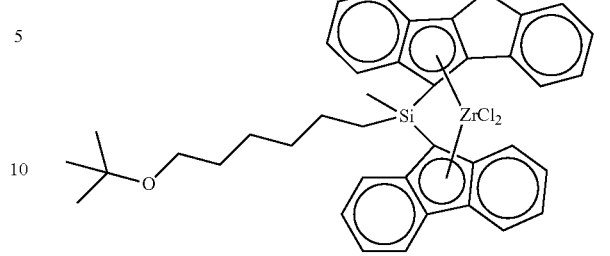
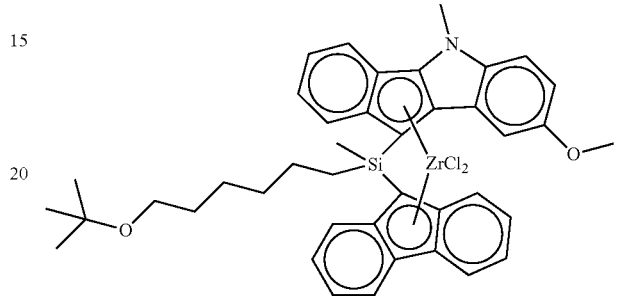
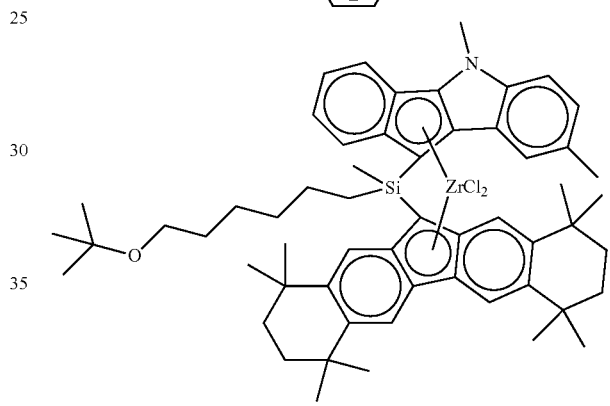
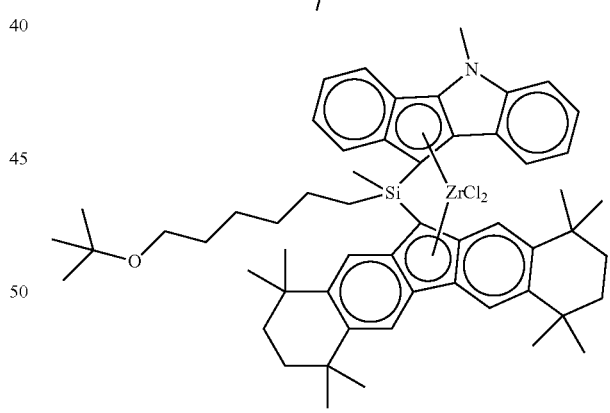
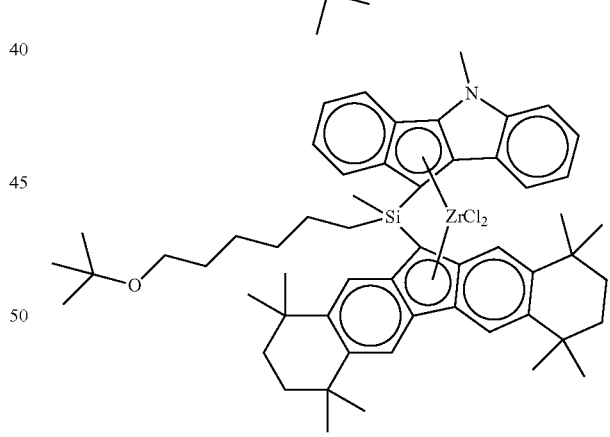
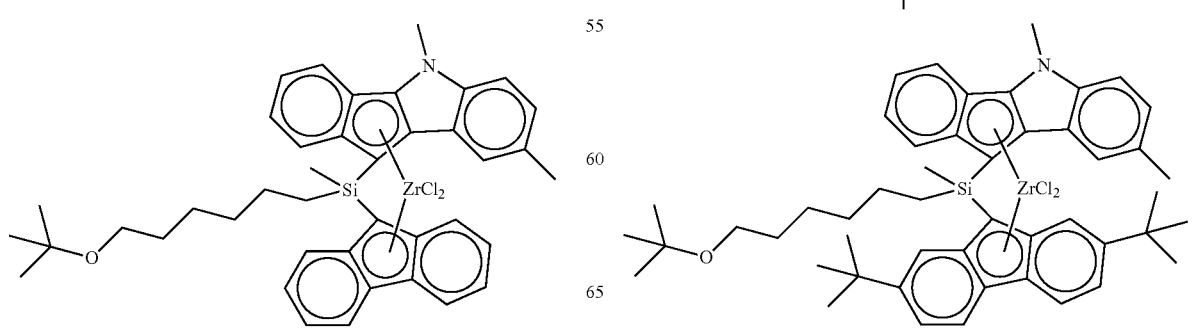

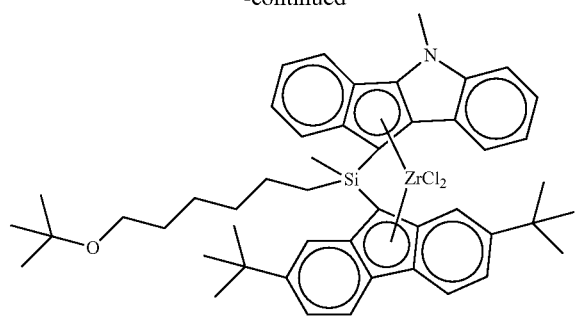
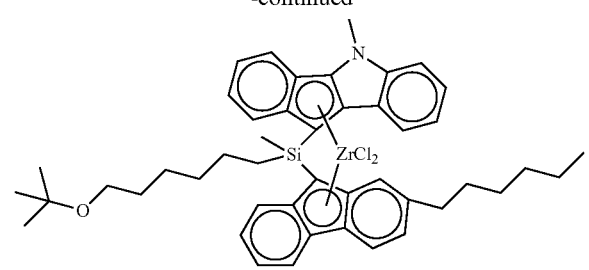
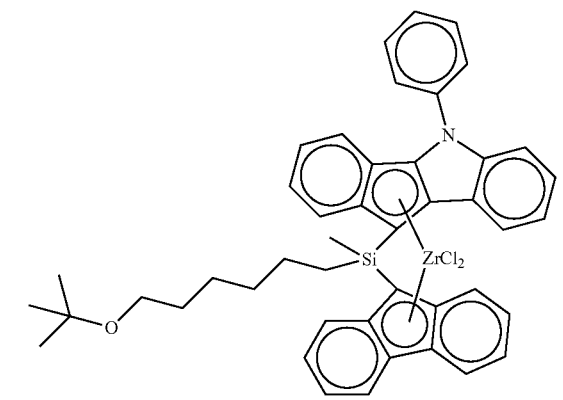
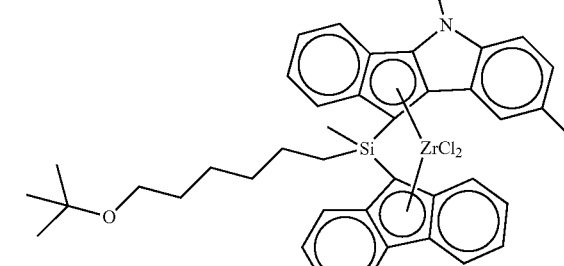
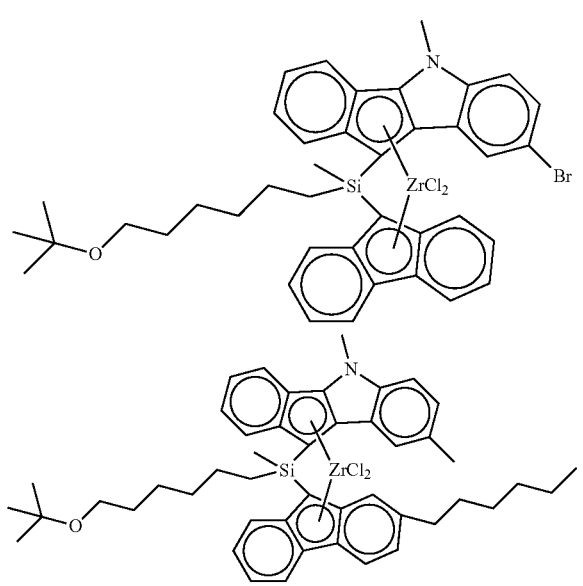
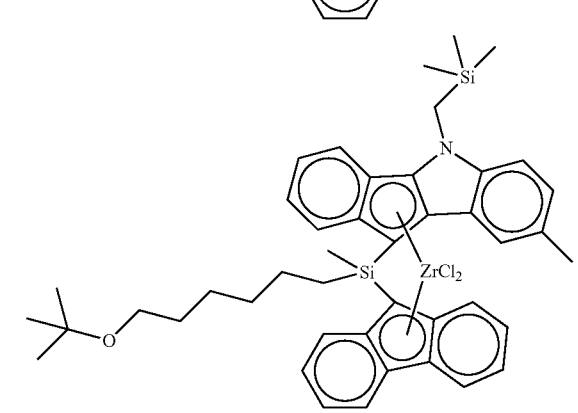
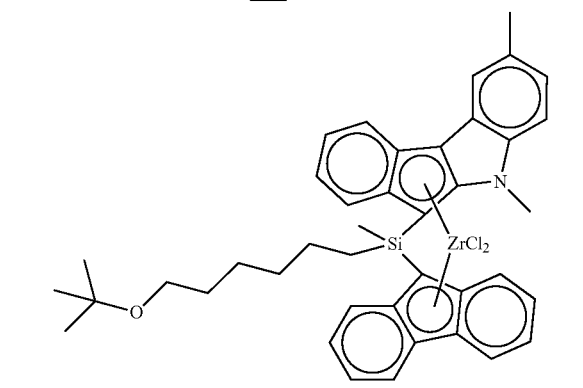
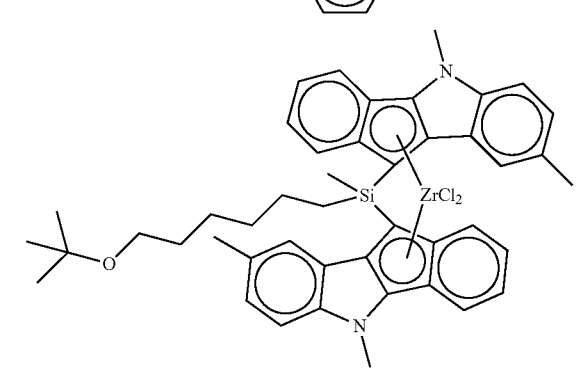
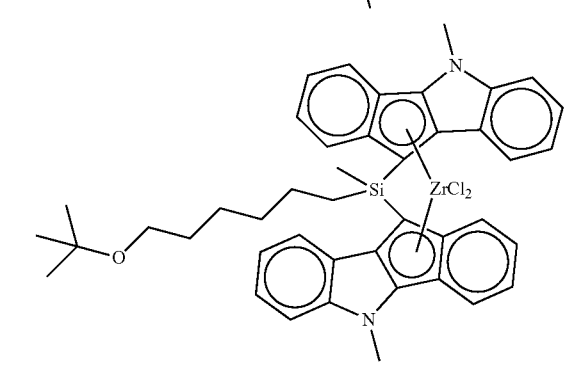

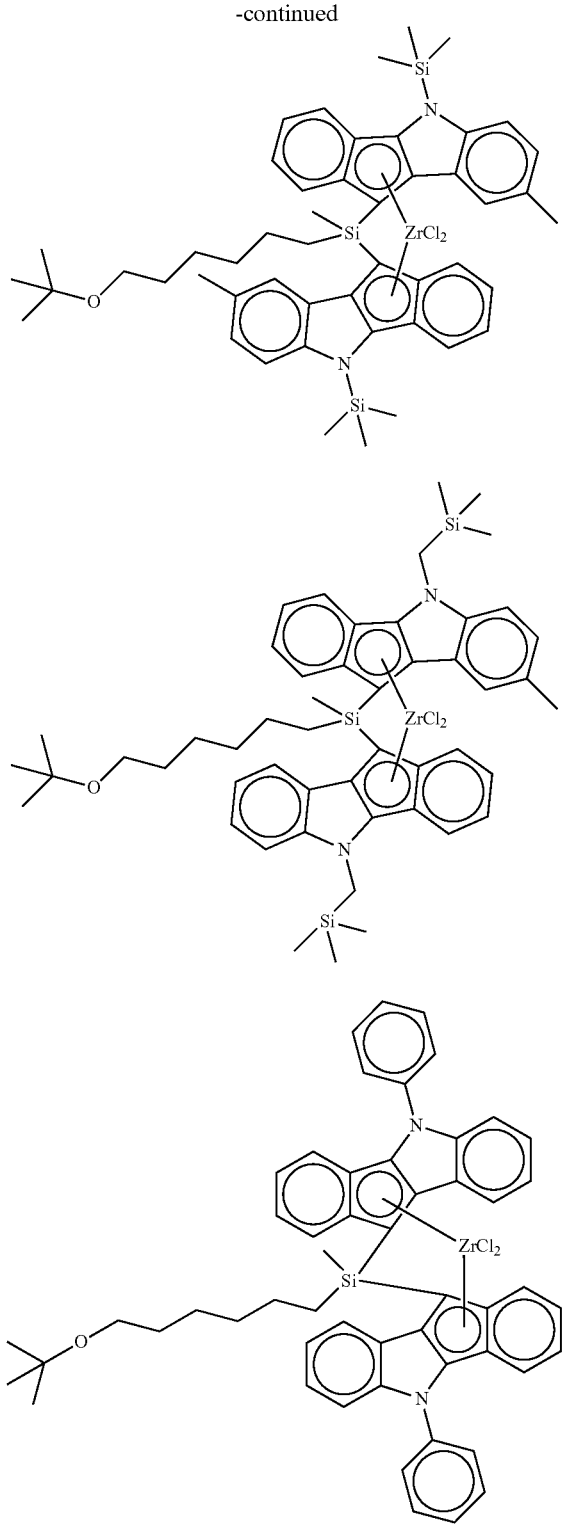

The second transition metal compound of Chemical Formula 6 exhibits excellent activity, and can polymerize a high molecular weight polyethylene copolymer. In particular, even when used by supporting on a support, it exhibits high polymerization activity, and can produce a polyethylene copolymer having an ultra-high molecular weight.

In addition, even when the polymerization reaction including hydrogen is carried out in order to produce a polyethylene copolymer having a high molecular weight and a broad molecular weight distribution, the second transition metal compound of Chemical Formula 6 according to the present invention exhibits a low hydrogen reaction and can still polymerize an ultrahigh molecular weight polyethylene copolymer with high activity. Therefore, even when used in combination with a catalyst having other properties, it is possible to produce a polyethylene copolymer satisfying the characteristics of high molecular weight without lowering the activity, and thus it is possible to easily produce a polyethylene copolymer having a broad molecular weight distribution while including a polyethylene copolymer of a polymer.

The second transition metal compound of Chemical Formula 6 can be obtained by connecting an indenoindole derivative and/or a fluorene derivative with a bridge compound to form a ligand compound, and adding a metal precursor compound thereto to perform metalation. The method for producing the second transition metal compound will be described in detail in examples provided later.

On the other hand, the second transition metal compound of Chemical Formula 7 is a structure in which two indene groups are crosslinked by a $SiQ_1Q_2$ bridge, and any one or more of the substituents $R_{71}$ to $R_{74}$ in the indene group is $-(CH_2)_q-OR_d$ (where $R_d$ is a $C_{1-6}$ linear or branched alkyl group, and q is an integer of 2 to 10), and each indene group may be substituted with $R_{75}$ and $R_{76}$.

In this way, in the second transition metal compound of Chemical Formula 7, at least one, particularly two or more, of tether groups of the formula $-(CH_2)_q-OR_d$ (where $R_d$ is a $C_{1-6}$ linear or branched alkyl group, and q is an integer of 2 to 10) are introduced in a substituent of indene or its derivative, and two indene groups are crosslinked by a $SiQ_1Q_2$ bridge. Thereby, a high molecular weight polyolefin can be produced.

Specifically, any one or more of $R_{71}$ to $R_{74}$ in Chemical Formula 7 has the feature of $-(CH_2)_q-OR_d$ (where $R_d$ is a $C_{1-6}$ linear or branched alkyl group, and q is an integer of 2 to 10). In Chemical Formula 7, $-(CH_2)_q-OR_d$ may specifically be a tert-butoxybutyl or a tert-butoxyhexyl. More specifically, two indene groups may each include a $-(CH_2)_q-OR_d$ group, and the $-(CH_2)_q-OR_d$ group may be a tert-butoxybutyl group or a tert-butoxyhexyl group. When the transition metal compound having such a structure is supported on a support, the $-(CH_2)_q-OR_d$ group can form a covalent bond through close interaction with a silanol group on the silica surface used as the support, and thus stable supported polymerization is possible. In addition, the functional group may affect the comonomer incorporation of alpha olefin comonomers such as 1-octene, 1-butene, or 1-hexene. In the case of $-(CH_2)_q-OR_d$ wherein q has a short alkyl chain of 10 or less, more particularly 6 or less, still more particularly 4 or less, the comonomer incorporation to alpha-olefin comonomers is lowered while maintaining the overall polymerization activity, which is advantageous for the preparation of a polyethylene copolymer having controlled copolymerization without deteriorating other physical properties.

The second transition metal compound represented by Chemical Formula 7 may be, for example, a compound represented by one of the structural formulas shown below, but is not limited thereto.

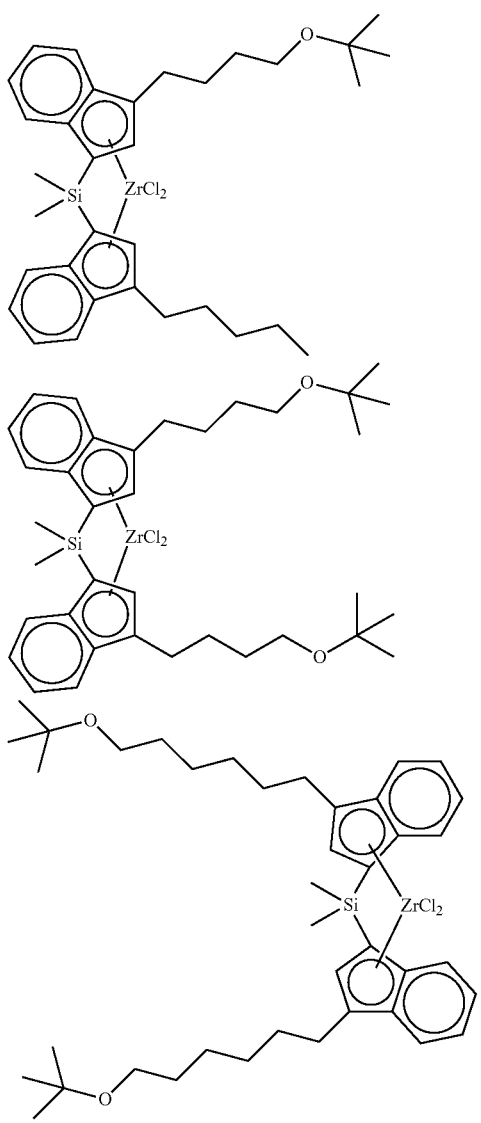

The hybrid supported catalyst used in the present invention may be those in which a transition metal mixture including a first mixture including a first transition metal compound containing at least one selected from the group consisting of Chemical Formulas 2 and 3, and a second transition metal compound containing at least one selected from the group consisting of Chemical Formulas 4 to 7, or a second mixture including a first transition metal compound containing Chemical Formula 1, and a second transition metal compound containing at least one selected from the group consisting of Chemical Formulas 4, 6, and 7, is supported on a support together with a cocatalyst compound. The transition metal mixture may include any one of a first mixture including a first transition metal compound containing at least one selected from the group consisting of Chemical Formulas 2 and 3, and a second transition metal compound containing at least one selected from the group consisting of Chemical Formulas 4 to 7, or a second mixture including a first transition metal compound containing Chemical Formula 1, and a second transition metal compound containing at least one selected from the group consisting of Chemical Formulas 4, 6, and 7.

That is, as the first transition metal compound contained in the first mixture, one kind of Chemical Formula 2, one kind of Chemical Formula 3, or two kinds of Chemical Formula 2 and Chemical Formula 3 can be used. In addition, as the second transition metal compound contained in the first mixture, one kind of Chemical Formula 4, one kind of Chemical Formula 5, one kind of Chemical Formula 6, one kind of Chemical Formula 7, two kinds of Chemical Formula 4 and Chemical Formula 5, two kinds of Chemical Formula 4 and Chemical Formula 6, two kinds of Chemical Formula 4 and Chemical Formula 7, two kinds of Chemical Formula 5 and Chemical Formula 6, two kinds of Chemical Formula 5 and Chemical Formula 7, two kinds of Chemical Formula 6 and Chemical Formula 7, three kinds of Chemical Formula 4, Chemical Formula 5, and Chemical Formula 6, three kinds of Chemical Formula 4, Chemical Formula 5, and Chemical Formula 7, three kinds of Chemical Formula 4, Chemical Formula 6, and Chemical Formula 7, three kinds of Chemical Formula 5, Chemical Formula 6, and Chemical Formula 7, or four kinds of Chemical Formula 4, Chemical Formula 5, Chemical Formula 6, and Chemical Formula 7 can be used.

On the other hand, as the first transition metal compound contained in the second mixture, one kind of Chemical Formula 1 can be used. In addition, as the second transition metal compound contained in the second mixture, one kind of Chemical Formula 4, one kind of Chemical Formula 6, one kind of Chemical Formula 7, two kinds of Chemical Formula 4 and Chemical Formula 6, two kinds of Chemical Formula 4 and Chemical Formula 7, two kinds of Chemical Formula 6 and Chemical Formula 7, and three kinds of Chemical Formula 4, Chemical Formula 6, and Chemical Formula 7 can be used.

Preferably, as the first transition metal compound, one kind of Chemical Formula 1 can be used, and as the second transition metal compound, one kind of Chemical Formula 4 can be used. In addition, as the first transition metal compound, one kind of Chemical Formula 2 can be used, and as the second transition metal compound, one kind of Chemical Formula 5 can be used. Further, as the first transition metal compound, one kind of Chemical Formula 3 can be used, and as the second transition metal compound, one kind of Chemical Formula 5 can be used. Further, as the first transition metal compound, one kind of Chemical Formula 1 can be used, and as the second transition metal compound, two kinds of Chemical Formula 6 and Chemical Formula 7 can be used.

In the transition metal mixture, the first transition metal compound may be contained in an amount of 1 to 80 parts by weight, or 5 to 50 parts by weight, based on 100 parts by weight of the second transition metal compound. By containing it in the above mixing ratio, it is possible to easily produce a polyethylene copolymer having excellent processability and long-term durability.

When the second transition metal compound includes two kinds of Chemical Formula 6 and Chemical Formula 7, the compound of Chemical Formula 7 can be contained in an amount of 10 to 80 parts by weight, or 40 to 60 parts by weight, based on 100 parts by weight of the compound of Chemical Formula 6.

In the hybrid supported catalyst according to the present invention, as the support, a support containing a hydroxy group on its surface can be used, and preferably, a support containing a highly reactive hydroxyl group and siloxane group, on which the surface is dried without moisture, can be used.

For example, silica, silica-alumina, silica-magnesia, and the like, that are dried at a high temperature, may be used, and may commonly contain an oxide, carbonate, sulfate, or nitrate, such as $Na_2O$, $K_2CO_3$, $BaSO_4$, $Mg(NO_3)_2$, or the like.

The drying temperature of the support is preferably 200° C. to 800° C., more preferably 300° C. to 600° C., and most preferably 300° C. to 400° C. If the drying temperature of the support is less than 200° C., too much moisture on its surface may be reacted with the cocatalyst. If the drying temperature is more than 800° C., pores on the support surface are combined with each other to reduce the surface area, the hydroxyl groups are removed, and only the siloxane groups remain on the surface. Thus, the reactive sites with the cocatalyst are reduced, which is not preferable.

An amount of hydroxyl group on the surface of support is preferably 0.1 mmol/g to 10 mmol/g, and more preferably 0.5 mmol/g to 5 mmol/g. The amount of the hydroxyl group on the surface of the support can be controlled depending on the preparation method of the support and its conditions, or drying conditions such as temperature, time, vacuum, and spray drying.

If the amount of the hydroxyl group is less than 0.1 mmol/g, the reactive sites with the cocatalyst are reduced. If the amount of the hydroxyl group is more than 10 mmol/g, the hydroxyl groups may come from moisture, in addition to hydroxyl groups being present on the particle surface of the support, which is not preferable.

The hybrid supported catalyst can induce the production of LCB (Long Chain Branches) in the polyethylene copolymer to be produced, specifically ethylene/1-hexene or an ethylene/1-butene copolymer.

Further, in the hybrid supported catalyst according to the present invention, the cocatalyst to be supported on the support to activate the transition metal compound is an organometallic compound containing a Group 13 metal, and is not particularly limited as long as it can be used in the polymerization of an olefin under a general metallocene catalyst.

Specifically, the cocatalyst compound may include any one or more of an aluminum-containing primary cocatalyst of the following Chemical Formula 8 and a boron-containing secondary cocatalyst of the following Chemical Formula 9.

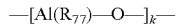
—[Al(R$_{77}$)—O—]$_k$—      [Chemical Formula 8]

In Chemical Formula 8, each $R_{77}$ is independently selected from the group consisting of a halogen and a halogen-substituted or unsubstituted hydrocarbyl group having 1 to 20 carbon atoms, and k is an integer of 2 or more.

T$^+$[BG$_4$]$^-$      [Chemical Formula 9]

In Chemical Formula 9, T$^+$ is a +1 valent polyatomic ion, B is boron in an oxidation state of +3, and each G is independently selected from the group consisting of a hydride, a dialkylamido, a halide, an alkoxide, an aryloxide, a hydrocarbyl, a halocarbyl, and a halo-substituted hydrocarbyl, wherein the G has 20 or less carbon atoms, provided that G is a halide at one or less position.

By using the first and second co-catalysts, the polydispersity index of the finally produced polyolefin becomes more uniform, and the polymerization activity can be enhanced.

The first cocatalyst of Chemical Formula 8 may be an alkylaluminoxane-based compound wherein the repeating units are combined into a linear, circular, or network form. Specific examples of the first cocatalyst include methylaluminoxane (MAO), ethylaluminoxane, isobutylaluminoxane, butylaluminoxane, and the like.

Further, the second cocatalyst of Chemical Formula 9 may be a trisubstituted ammonium salt, a dialkylammonium salt, or a trisubstituted phosphonium salt type of borate compound. Specific examples of the second cocatalyst include a borate-based compound in the form of a trisubstituted ammonium salt, such as trimethylammonium tetraphenylborate, methyl dioctadecylammonium tetraphenylborate, triethylammonium tetraphenylborate, tripropylammonium tetraphenylborate, tri(n-butyl)ammonium tetraphenylborate, methyltetradecyloctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium, tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis (2,3,4,6-tetrafluorophenyl)borate, dimethyl(t-butyl) ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate or N,N-dimethyl-(2,4,6-trimethylanilinium)tetrakis-(2,3,4,6-tetrafluorophenyl)borate, and the like; a borate-based compound in the form of a dialkylammonium salt, such as dioctadecylammonium tetrakis(pentafluorophenyl)borate, ditetradecylammonium tetrakis(pentafluorophenyl) borate, or dicyclohexylammonium tetrakis(pentafluorophenyl)borate; or a borate-based compound in the form of a trisubstituted phosphonium salt, such as triphenylphosphonium tetrakis(pentafluorophenyl)borate, methyldioctadecylphosphonium tetrakis(pentafluorophenyl)borate, or tri(2,6-dimethylphenyl)phosphonium tetrakis(pentafluorophenyl)borate.

Such hybrid supported catalyst can be prepared, for example, by a method including the steps of supporting a cocatalyst on a support, and sequentially supporting the first and second transition metal compounds on the cocatalyst-supported support. At this time, the order of supporting the transition metal compounds is not particularly limited, but the first transition metal compound having a small molecular structure and the second transition metal compound can be supported in this order.

Further, in the step of supporting the cocatalyst on the support, a cocatalyst supported support may be prepared by adding a cocatalyst to a support dried at a high temperature and stirring it at a temperature of about 20° C. to 120° C.

In addition, in the step of supporting the catalyst precursor on the cocatalyst-supported support, a supported catalyst can be produced by adding the transition metal compound to the cocatalyst-supported support obtained in the step of supporting the cocatalyst on the support and then stirring it at a temperature of about 20° C. to 120° C. to produce a supported catalyst.

In the step of supporting the catalyst precursor on the cocatalyst-supported support, the supported catalyst may be produced by adding a transition metal compound to the cocatalyst-supported support, stirring the mixture, and further adding a co-catalyst.

The content of the support, the cocatalyst, the cocatalyst-supported support, and the transition metal compound used in the hybrid supported catalyst according to one embodiment of the present invention can be appropriately controlled depending on the physical properties or effects of the desired supported catalyst.

In the hybrid supported catalyst according to one embodiment of the present invention, the weight ratio between the transition metal mixture including the first and second transition metal compounds and the support may be from 1:10 to 1:1000, and more specifically from 1:10 to 1:500. When the support and the transition metal mixture are contained in a weight ratio within the range described above, an optimum shape can be exhibited.

Further, when the hybrid supported catalyst further includes a cocatalyst, the weight ratio of the cocatalyst to the support can be from 1:1 to 1:100, and more specifically from 1:1 to 1:50. When the cocatalyst and the support are contained in the above weight ratio, the activity and the polymer microstructure can be optimized.

As the reaction solvent in the preparation of the hybrid supported catalyst, hydrocarbon solvents such as pentane, hexane, heptane, and the like, or aromatic solvents such as benzene, toluene, and the like, can be used.

For more specific methods for preparing the supported catalyst, refer to examples described later. However, the preparation method of the supported catalyst is not limited to the content described herein, and the aforementioned preparation method may further adopt a step that is ordinarily adopted in the technical field to which the present invention belongs. The step(s) of the preparation method may be modified by a generally changeable step(s).

On the other hand, the polyethylene copolymer according to the present invention can be produced by polymerizing ethylene monomers and alpha olefin monomers in the presence of the hybrid supported catalyst described above.

For the polymerization of the monomer, various polymerization processes known as polymerization reactions of an olefin monomer such as a continuous solution polymerization process, a bulk polymerization process, a suspension polymerization process, a slurry polymerization process, or an emulsion polymerization process can be employed.

The polymerization temperature may be 25° C. to 500° C., preferably 25° C. to 200° C., and more preferably 50° C. to 150° C. Further, the polymerization pressure may be from 1 bar to 100 bar, preferably from 1 bar to 50 bar, and more preferably from 5 bar to 30 bar.

Since the first and second transition metal compounds in the present invention are excellent in hydrogen reactivity, a polyethylene copolymer having a desired molecular weight and melt index can be effectively produced by controlling the amount of hydrogen gas used in the polymerization step.

Specifically, in the step of polymerizing the ethylene monomer and the alpha olefin monomer, hydrogen gas can be added in an amount of 0.005 wt % to 0.040 wt %, 0.008 wt % to 0.035 wt %, or 0.005 wt % to 0.020 wt % relative to the ethylene monomer.

More specifically, when the transition metal of Chemical Formula 1 is used as the first transition metal compound and the transition metal of Chemical Formula 4 is used as the second transition metal compound, in the step of polymerizing the ethylene monomer and the alpha olefin monomer, 0.005 wt % to 0.013 wt % of hydrogen gas may be added relative to the ethylene monomer.

Further, when the transition metal of Chemical Formula 2 is used as the first transition metal compound and the transition metal of Chemical Formula 5 is used as the second transition metal compound, in the step of polymerizing the ethylene monomer and the alpha olefin monomer, 0.033 wt % to 0.040 wt % of hydrogen gas may be added relative to the ethylene monomer.

The above-mentioned metallocene-supported catalyst may be injected after being dissolved or diluted in an aliphatic hydrocarbon solvent having 5 to 12 carbon atoms, for example, pentane, hexane, heptane, nonane, decane, and isomers thereof, an aromatic hydrocarbon solvent such as toluene and benzene, or a hydrocarbon solvent substituted with a chlorine atom such as dichloromethane and chlorobenzene. The solvent is used, preferably, after removing a small amount of water, air, or the like acting as a catalyst poison by treatment of a small amount of alkyl aluminum. It is also possible to use an additional cocatalyst.

According to another embodiment of the present invention, a molded article produced using the above-mentioned polyethylene copolymer, specifically, a pipe such as a high inner pressure heating pipe, a mining pipe, or a large-diameter pipe, is provided.

Advantageous Effects

According to the present invention, a polyethylene copolymer which has excellent processability and long-term durability and thus is useful for hollow molding of a pipe or the like can be provided.

BRIEF DESCRIPTION OF THE DRAWINGS

FIG. 1 is a view showing a molecular weight distribution curve (solid line) and an SCB distribution curve (dotted line) of the polyethylene copolymer of Example 1.

FIG. 2 is a view showing a method of measuring the comonomer distribution index (CDI) of the polyethylene copolymer of Example 1.

DETAILED DESCRIPTION OF THE EMBODIMENTS

The present invention will be described in more detail by way of examples shown below. However, these examples are given to merely illustrate the invention, and are not intended to limit the scope of the invention thereto.

PREPARATION EXAMPLE

Preparation Examples of First Transition Metal Compound: Preparation Examples 1 to 3

Preparation Example 1

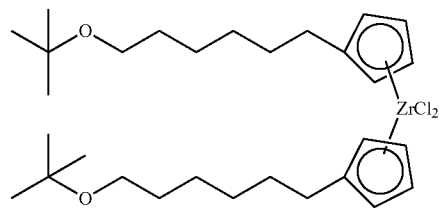

t-butyl-O—(CH$_2$)$_6$—Cl was prepared using 6-chlorohexanol according to the method suggested in the literature (Tetrahedron Lett. 2951 (1988)), and reacted with NaCp to prepare t-butyl-O—(CH$_2$)$_6$—C$_5$H$_5$ (yield: 60%, b.p. 80/0.1 mmHg).

Further, t-butyl-O—(CH$_2$)$_6$—C$_5$H$_5$ was dissolved in THF at −78° C., n-butyl lithium (n-BuLi) was slowly added thereto, the reaction temperature was raised to room temperature, and then was allowed to react for 8 hours. The solution was again reacted in which the already synthesized lithium salt solution was slowly added to a suspension solution of ZrCl$_4$(THF)$_2$ (1.70 g, 4.50 mmol)/THF (30 ml) at −78° C. and further reacted at room temperature for 6 hours.

All volatiles were vacuum dried, and a hexane solvent was added to the obtained oily liquid substance and the mixture was filtered out. The filtered solution was vacuum dried, and hexane was added thereto to induce a precipitate at a low temperature (−20° C.). The obtained precipitate was filtered off at a low temperature to obtain a [tBu-O—(CH$_2$)$_6$—C$_5$H$_4$]$_2$ZrCl$_2$ compound in the form of a white solid (yield: 92%).

$^1$H NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H)

$^{13}$C NMR (CDCl$_3$): 135.09, 116.66, 112.28, 72.42, 61.52, 30.66, 30.61, 30.14, 29.18, 27.58, 26.00

Preparation Example 2

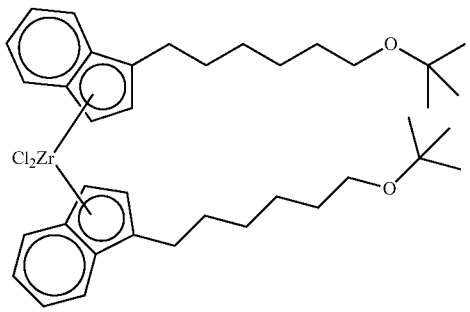

(1) Preparation of Ligand Compound 10.8 g (100 mmol) of chlorohexanol was added to a dried 250 mL Schlenk flask, to which 10 g of a molecular sieve and 100 mL of MTBE (methyl tert-butyl ether) were added, and 20 g of sulfuric acid was added slowly over 30 minutes. The reaction mixture turned pink slowly over time. After 16 hours, it was poured into a saturated sodium bicarbonate solution with ice cooling. The mixture was extracted four times with 100 mL of ether, and the combined organic layer was dried over MgSO$_4$ and filtered. The solvent was removed under vacuum reduced pressure. Thereby, 10 g (yield: 60%) of 1-(tertbutoxy)-6-chlorohexane in the form of a yellow liquid was obtained.

$^1$H NMR (500 MHz, CDCl$_3$): 3.53 (2H, t), 3.33 (2H, t), 1.79 (2H, m), 1.54 (2H, m), 1.45 (2H, m), 1.38 (2H, m), 1.21 (9H, s)

4.5 g (25 mmol) of 1-(tert-butoxy)-6-chlorohexane synthesized above was added to a dried 250 mL Schlenk flask, and dissolved in 40 mL of THF. 20 mL of a sodium indenide THF solution was slowly added thereto and then stirred for one day. The reaction mixture was quenched by addition of 50 mL of water, and extracted with ether (50 mL×3), and then the combined organic layer was washed thoroughly with brine. The remaining moisture was dried over MgSO$_4$ and filtered. The solvent was removed under vacuum reduced pressure. Thereby, a dark brown viscous product, 3-(6-tert-butoxy hexyl)-1H-indene, was obtained in a quantitative yield.

Mw=272.21 g/mol $^1$H NMR (500 MHz, CDCl$_3$): 7.47 (1H, d), 7.38 (1H, d), 7.31 (1H, t), 7.21 (1H, t), 6.21 (1H, s), 3.36 (2H, m), 2.57 (2H, m), 1.73 (2H, m), 1.57 (2H, m), 1.44 (6H, m), 1.21 (9H, s)

(2) Preparation of Transition Metal Compound

The 3-(6-tert-butoxy hexyl)-1H-indene was dissolved in THF at −78° C., n-butyl lithium (n-BuLi) was slowly added thereto, the reaction temperature was raised to room temperature, and was then allowed to react for 8 hours. The solution was again reacted in which the already synthesized lithium salt solution was slowly added to a suspension solution of ZrCl$_4$(THF)$_2$ (1.70 g, 4.50 mmol)/THF (30 ml) at −78° C., and then further reacted at room temperature for 6 hours.

All volatiles were vacuum dried, and a hexane solvent was added to the obtained oily liquid substance and the mixture was filtered out. The filtered solution was vacuum dried, and hexane was added thereto to induce a precipitate at a low temperature (−20° C.). The obtained precipitate was filtered off at a low temperature to obtain a [3-(6-tert-butoxy hexyl)-1H-indene]$_2$ZrCl$_2$ compound in the form of a white solid (yield: 78%).

$^1$H NMR (300 MHz, CDCl$_3$): 7.47 (2H, d), 7.38 (2H, d), 7.21 (2H, t), 6.95 (2H, m), 6.10 (1H, s), 5.87 (1H, s), 5.48 (1H, s), 5.36 (1H, s) 3.36 (4H, m), 2.95 (2H, m), 2.76 (2H, m), 1.47 (8H, m), 1.30 (4H, m), 1.05 (18H, s)

Preparation Example 3

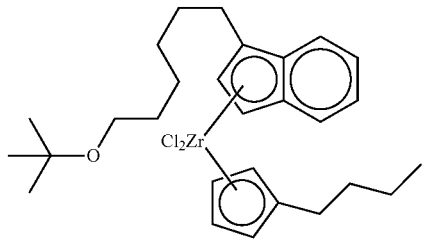

(1) Preparation of Ligand Compound 10.8 g (100 mmol) of chlorohexanol was added to a dried 250 mL Schlenk flask, to which 10 g of a molecular sieve and 100 mL of MTBE (methyl tert-butyl ether) were added, and 20 g of sulfuric acid was added slowly over 30 minutes. The reaction mixture turned pink slowly over time. After 16 hours, it was poured into a saturated sodium bicarbonate solution with ice cooling. The mixture was extracted four times with 100 mL of ether, and the combined organic layer was dried over MgSO$_4$ and filtered. The solvent was removed under vacuum reduced pressure. Thereby, 10 g (yield: 60%) of 1-(tertbutoxy)-6-chlorohexane in the form of a yellow liquid was obtained.

$^1$H NMR (500 MHz, CDCl$_3$): 3.53 (2H, t), 3.33 (2H, t), 1.79 (2H, m), 1.54 (2H, m), 1.45 (2H, m), 1.38 (2H, m), 1.21 (9H, s)

4.5 g (25 mmol) of 1-(tert-butoxy)-6-chlorohexane synthesized above was added to a dried 250 mL Schlenk flask, and dissolved in 40 mL of THF. 20 mL of a sodium indenide THF solution was slowly added thereto and then stirred for one day. The reaction mixture was quenched by addition of 50 mL of water, and extracted with ether (50 mL×3), and then the combined organic layer was washed thoroughly with brine. The remaining moisture was dried over MgSO$_4$ and filtered. The solvent was removed under vacuum reduced pressure. Thereby, a dark brown viscous product, 3-(6-tert-butoxy hexyl)-1H-indene, was obtained in a quantitative yield.

Mw=272.21 g/mol $^1$H NMR (500 MHz, CDCl$_3$): 7.47 (1H, d), 7.38 (1H, d), 7.31 (1H, t), 7.21 (1H, t), 6.21 (1H, s), 3.36 (2H, m), 2.57 (2H, m), 1.73 (2H, m), 1.57 (2H, m), 1.44 (6H, m), 1.21 (9H, s)

(2) Preparation of Transition Metal Compounds 5.44 g (20 mmol) of 3-(6-tert-butoxyhexyl)-1H-indene prepared above was added to a dried 250 mL Schlenk flask, and dissolved in 60 mL of ether. 13 mL of an n-BuLi 2.0 M hexane solution was added thereto, stirred for one day, and then a toluene solution of n-butyl cyclopentadiene ZrCl$_3$ (concentration of 0.378 mmol/g) was slowly added at −78° C. When the reaction mixture was heated to room temperature, it turned into a white suspension with a yellow solid floating in a clear brown solution. After 12 hours, 100 mL of hexane was added to the reaction mixture to further precipitate. After that, the mixture was filtered under argon to obtain a yellow filtrate, which was dried. Thereby, it was confirmed that 3-(6-(tert-butoxy)hexyl)-1H-inden-1-yl)(3-butylcylcopenta-2,4-dien-1-yl) zirconium(IV) chloride was produced as the desired compound.

Mw=554.75 g/mol $^1$H NMR (500 MHz, CDCl$_3$): 7.62 (2H, m), 7.24 (2H, m), 6.65 (1H, s), 6.39 (1H, s), 6.02 (1H, s), 5.83 (1H, s), 5.75 (1H, s), 3.29 (2H, m), 2.99 (1H, m), 2.89 (1H, m), 2.53 (1H, m), 1.68 (2H, m), 1.39-1.64 (10H, m), 1.14 (9H, s), 0.93 (4H, m)

Preparation Example of Second Transition Metal Compound: Preparation Examples 4 to 7

Preparation Example 4

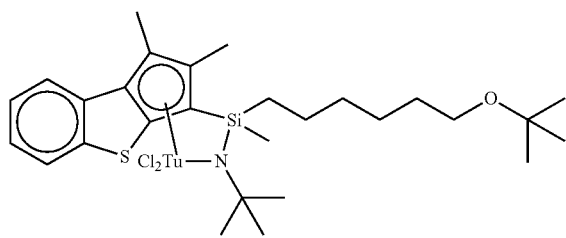

(1) Preparation of Ligand A 4.0 g (30 mmol) of 1-benzothiophene was dissolved in THF to prepare a 1-benzothiophene solution. Then, 14 mL (36 mmol, 2.5 M in hexane) of an n-BuLi solution and 1.3 g (15 mmol) of CuCN were added to the 1-benzothiophene solution.

Subsequently, 3.6 g (30 mmol) of tigloyl chloride was slowly added to the solution at −80° C., and the obtained solution was stirred at room temperature for about 10 hours. Then, 10% HCl was poured into the solution to quench the reaction, and the organic layer was separated with dichloromethane to obtain (2E)-1-(1-benzothiene-2-yl)-2-methyl-2-buten-1-one as a beige solid.

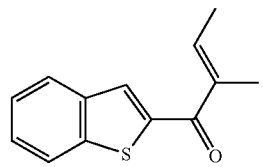

$^1$H NMR (CDCl$_3$): 7.85-7.82 (m, 2H), 7.75 (m, 1H), 7.44-7.34 (m, 2H), 6.68 (m, 1H), 1.99 (m, 3H), 1.92 (m, 3H)

While vigorously stirring a solution in which 5.0 g (22 mmol) of the (2E)-1-(1-benzothiene-2-yl)-2-methyl-2-buten-1-one prepared above was dissolved in 5 mL of chlorobenzene, 34 mL of sulfuric acid was slowly added to the solution. Then, the solution was stirred at room temperature for about 1 hour. Subsequently, ice water was poured into the solution, and the organic layer was separated with an ether solvent to obtain 4.5 g (yield: 91%) of 1,2-dimethyl-1,2-dihydro-3H-benzo[b]cyclopenta[d] thiophen-3-one as a yellow solid.

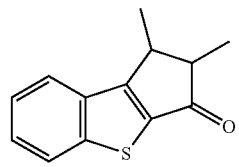

$^1$H NMR (CDCl$_3$): 7.95-7.91 (m, 2H), 7.51-7.45 (m, 2H), 3.20 (m, 1H), 2.63 (m, 1H), 1.59 (d, 3H), 1.39 (d, 3H)

To a solution in which 2.0 g (9.2 mmol) of 1,2-dimethyl-1,2-dihydro-3H-benzo[b]cyclopenta[d]thiophen-3-one was dissolved in a mixed solvent of 20 mL of THF and 10 mL of methanol, 570 mg (15 mmol) of NaBH$_4$ was added at 0° C. Then, the solution was stirred at room temperature for about 2 hours. After that, HCl was added to the solution to adjust the pH to 1, and the organic layer was separated with an ether solvent to obtain an alcohol intermediate.

The alcohol intermediate was dissolved in toluene to prepare a solution. Then, 190 mg (1.0 mmol) of p-toluenesulfonic acid was added to the solution and refluxed for about 10 minutes. The resulting reaction mixture was separated by column chromatography to obtain 1.8 g (9.0 mmol, yield: 98%) of orange-brownish liquid 1,2-dimethyl-3H-benzo[b]cyclopenta[d] thiophene (ligand A).

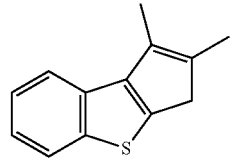

$^1$H NMR (CDCl$_3$): 7.81 (d, 1H), 7.70 (d, 1H), 7.33 (t, 1H), 7.19 (t, 1H), 6.46 (s, 1H), 3.35 (q, 1H), 2.14 (s, 3H), 1.14 (d, 3H)

(2) Preparation of Ligand B 13 mL (120 mmol) of t-butylamine and 20 mL of an ether solvent were added to a 250 mL Schlenk flask, and 16 g (60 mmol) of (6-tert-butoxyhexyl)dichloro(methyl)silane and 40 mL of an ether solvent were added to a different 250 mL Schlenk flask, to prepare a t-butylamine solution and a (6-tert-butoxyhexyl)dichloro(methyl)silane solution, respectively. Then, the t-butylamine solution was cooled to −78° C., and then a (6-tert-butoxyhexyl)dichloro(methyl)silane solution was slowly added to the cooled solution, which was stirred at room temperature for about 2 hours. The resulting white suspension was filtered to obtain an ivory liquid 1-(6-(tert-butoxy)hexyl)-N-(tert-butyl)-1-chloro-1-methylsilanamine (ligand B).

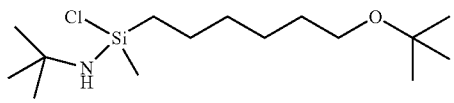 [SMILES: CC(C)(C)N[Si](C)(Cl)CCCCCCOC(C)(C)C]

$^1$H NMR (CDCl$_3$): 3.29 (t, 2H), 1.52-1.29 (m, 10H), 1.20 (s, 9H), 1.16 (s, 9H), 0.40 (s, 3H)

(3) Crosslinking of Ligands A and B

To a 250 mL Schlenk flask, 1.7 g (8.6 mmol) of 1,2-dimethyl-3H-benzo[b]cyclopenta[d]thiophene (ligand A) was added and 30 mL of THF was added to prepare a ligand A solution. The ligand A solution was cooled to −78° C., and then 3.6 mL (9.1 mmol, 2.5 M in hexane) of an n-BuLi solution was added to the ligand A solution, which was stirred at room temperature overnight to obtain a purple-brown solution. The solvent of the purple-brown solution was replaced with toluene, and in this solution, a solution in which 39 mg (0.43 mmol) of CuCN was dispersed in 2 mL of THF was injected to prepare a solution A.

Meanwhile, 1-(6-(tert-butoxy)hexyl)-N-(tert-butyl)-1-chloro-1-methylsilanamine (ligand B) and toluene were injected in a 250 mL Schlenk flask to prepare a solution B, which was then cooled to −78° C. Then, the solution A previously prepared was slowly added to the cooled solution B, and the mixture of solutions A and B was stirred at room temperature overnight. The resulting solid was removed by filtration to obtain 4.2 g of a brownish viscous liquid 1-(6-(tert-butoxy)hexyl)-N-(tert-butyl)-1-(1,2-dimethyl-3H-benzo[b]cyclopenta[d]thiophen-3-yl)-1-methylsilanamine (crosslinked product of ligands A and B) (>99% yield).

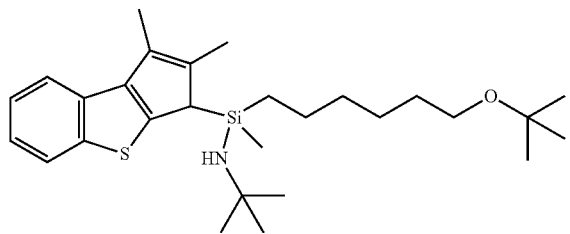 [SMILES: CC1=C(C)C([Si](C)(CCCCCCOC(C)(C)C)NC(C)(C)C)c2sc3ccccc3c21]

In order to confirm the structure of the crosslinked product of ligands A and B, the crosslinked product was lithiated at room temperature, and then H-NMR spectra were obtained using a sample dissolved in small amounts of pyridine-D5 and CDCl$_3$.

$^1$H NMR (pyridine-D5 and CDCl$_3$): 7.81 (d, 1H), 7.67 (d, 1H), 7.82-7.08 (m, 2H), 3.59 (t, 2H), 3.15 (s, 6H), 2.23-1.73 (m, 10H), 2.15 (s, 9H), 1.91 (s, 9H), 1.68 (s, 3H)

(4) Preparation of Transition Metal Compounds 4.2 g (8.6 mmol) of 1-(6-(tert-butoxy)hexyl)-N-(tert-butyl)-1-(1,2-dimethyl-3H-benzo[b]cyclopenta[d]thiophen-3-yl)-1-methylsilane amine (crosslinked product of ligands A and B) was added to a 250 mL Schlenk flask, and 14 mL of toluene and 1.7 mL of n-hexane were injected into the flask to dissolve the crosslinked product. After cooling the solution to −78° C., 7.3 mL (18 mmol, 2.5 M in hexane) of an n-BuLi solution was injected into the cooled solution. Then, the solution was stirred at room temperature for about 12 hours. Subsequently, 5.3 ml (38 mmol) of trimethylamine was added to the solution, and this solution was stirred at about 40° C. for about 3 hours to prepare a solution C.

Meanwhile, 2.3 g (8.6 mmol) of TiCl$_4$(THF)$_2$ and 10 mL of toluene were added to a separately prepared 250 mL Schlenk flask to prepare a solution D in which TiCl$_4$(THF)$_2$ was dispersed in toluene. The previously prepared solution C was added slowly to the above solution D at −78° C., and the mixture of solutions C and D was stirred at room temperature for about 12 hours. After that, the solution was depressurized to remove the solvent, and the resulting solute was dissolved in toluene. The solids that did not dissolve in toluene were removed by filtration. The solvent was removed from the filtered solution to obtain 4.2 g (yield: 83%) of the transition metal compound in the form of a brown solid.

$^1$H NMR (CDCl$_3$): 8.01 (d, 1H), 7.73 (d, 1H), 7.45-7.40 (m, 2H), 3.33 (t, 2H), 2.71 (s, 3H), 2.33 (d, 3H), 1.38 (s, 9H), 1.18 (s, 9H), 1.80-0.79 (m, 10H), 0.79 (d, 3H)

Preparation Example 5

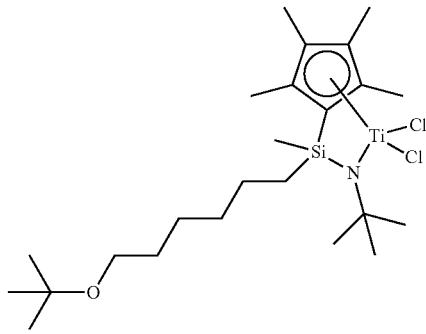

50 g of Mg (s) was added to a 10 L reactor at room temperature, and then 300 mL of THF was added thereto. About 0.5 g of I$_2$ was added, and then the temperature of the reactor was maintained at 50° C. After the temperature of the reactor was stabilized, 250 g of 6-t-buthoxyhexyl chloride was added to the reactor at a rate of 5 mL/min using a feeding pump. It was observed that, as 6-t-buthoxyhexyl chloride was added, the temperature of the reactor increased by about 4 to 5° C. While 6-t-buthoxyhexyl chloride was continuously added, the solution was stirred for 12 hours. After reaction for 12 hours, a black reaction solution was obtained. 2 mL of the produced black solution was taken, water was added to obtain an organic layer, and 6-t-buthoxyhexane was confirmed by 1H-NMR. It could be seen from the 6-t-buthoxyhexane that a Grignard reaction progressed well. Thereby, 6-t-buthoxyhexyl magnesium chloride was synthesized.

500 g of MeSiCl$_3$ and 1 L of THF were added to a reactor, and the reactor was cooled to −20° C. 560 g of the synthesized 6-t-buthoxyhexyl magnesium chloride was added to the reactor at a rate of 5 mL/min using a feeding pump. After the feeding of the Grignard reagent was completed, the solution was stirred for 12 hours while slowly raising the temperature of the reactor to room temperature. After reaction for 12 hours, it was confirmed that white MgCl$_2$ salt was produced. 4 L of hexane was added, and the salt was removed through a Labdori to obtain a filtered solution. The obtained filtered solution was added to a reactor, and then hexane was removed at 70° C. to obtain a light yellow liquid. It was confirmed through 1H-NMR that the obtained liquid was desired methyl(6-t-buthoxy hexyl)dichlorosilane.

$^1$H-NMR (CDCl$_3$): 3.3 (t, 2H), 1.5 (m, 3H), 1.3 (m, 5H), 1.2 (s, 9H), 1.1 (m, 2H), 0.7 (s, 3H)

1.2 mol (150 g) of tetramethylcyclopentadiene and 2.4 L of THF were added to a reactor, and then the reactor was cooled to −20° C. 480 mL of n-BuLi was added to the reactor at a rate of 5 mL/min using a feeding pump. After the n-BuLi was added, the solution was stirred for 12 hours while slowly raising the temperature of the reactor to room temperature. After reaction for 12 hours, an equivalent of methyl(6-t-buthoxy hexyl)dichlorosilane) (326 g, 350 mL) was rapidly added to the reactor. The solution was stirred for 12 hours while slowly raising the temperature of the reactor to room temperature, and then the reactor was cooled to 0° C. again, and 2 equivalents of t-BuNH$_2$ was added. While slowly raising the temperature of the reactor to room temperature, the solution was stirred for 12 hours. After reaction for 12 hours, THF was removed, 4 L of hexane was added, and salts were removed through a Labdori to obtain a filtered solution. The filtered solution was added to the reactor again, and then hexane was removed at 70° C. to obtain a yellow solution. It was confirmed through 1H-NMR that the obtained yellow solution was methyl(6-t-buthoxyhexyl)(tetramethylCpH)t-butylaminosilane).

To the dilithium salt of the ligand at −78° C. synthesized from n-BuLi and the ligand methyl(tetramethylCpH)t-butylaminosilane in a THF solution, TiCl$_3$(THF)$_3$ (10 mmol) was rapidly added. The reaction solution was stirred for 12 hours while slowly raising the temperature from −78° C. to room temperature. After stirring for 12 hours, an equivalent of PbCl$_2$ (10 mmol) was added to the reaction solution at room temperature, and the solution was stirred for 12 hours. After stirring for 12 hours, a bluish black solution was obtained. THF was removed in the produced reaction solution, and then hexane was added to filter the product. After removing hexane in the obtained filtered solution, it was confirmed through 1H-NMR that (tBu-O—(CH$_2$)$_6$)(CH$_3$)Si(C$_5$(CH$_3$)$_4$)(tBu-N)TiCl$_2$ was obtained as desired ([methyl(6-t-buthoxy-hexyl)silyl(η5-tetramethylCp)(t-butylamido)]TiCl$_2$.

$^1$H-NMR (CDCl$_3$): 3.3 (s, 4H), 2.2 (s, 6H), 2.1 (s, 6H), 1.8~0.8 (m), 1.4 (s, 9H), 1.2 (s, 9H), 0.7 (s, 3H)

Preparation Example 6

(1) Preparation of Ligand Compound 102.54 g (376.69 mmol) of 3-tether indene was added to a dried 1 L Schlenk flask, and 450 ml of THF was injected under argon. The solution was cooled to −30° C., and 173.3 ml (119.56 g, d=0.690 g/ml) of a 2.5 M n-BuLi hexane solution was added dropwise thereto. The reaction mixture was slowly warmed to room temperature and then stirred until the next day. The lithiated 3-tether indene solution was cooled to −78° C., and then 24.3 g (188.3 mmol) of dimethyldichlorosilicone was prepared and added dropwise to the Schlenk flask. After the injection, the mixture was slowly heated to room temperature, stirred for a day, and then quenched by adding 200 ml of water in the flask. The organic layer was separated and dried over MgSO$_4$. As a result, 115 g (191.4 mmol, 101.6%) of a yellow oil was obtained.

NMR standard purity (wt %)=100%. Mw=600.99. $^1$H NMR (500 MHz, CDCl$_3$): −0.53, −0.35, −0.09 (6H, t), 1.18 (18H, m), 1.41 (8H, m), 1.54 (4H, m), 1.68 (4H, m), 2.58 (4H, m), 3.32 (4H, m), 6.04 (1H, s), 6.26 (1H, s), 7.16 (2H, m), 7.28 (3H, m), 7.41 (3H, m).

(2) Preparation of Transition Metal Compounds 191.35 mmol of the ligand compound synthesized above was added to a 2 L Schlenk flask dried in an oven. 4 equivalents of MTBE (67.5 g, d=0.7404 g/ml) and 696 g of toluene (d=0.87 g/ml) were dissolved in a solvent, and 2.1 equivalents of an n-BuLi solution (160.7 ml) was added and lithiated until the next day. 72.187 g (191.35 mmol) of ZrCl$_4$(THF)$_2$ was taken in a glove box and placed in in a 2 L Schlenk flask to prepare a suspension containing toluene. Both flasks were cooled to −78° C., and the ligand anion was slowly added to the Zr suspension. After completion of the injection, the reaction mixture was slowly warmed to room temperature. The mixture was stirred for one day, and then the slurry was filtered under argon and filtered. Both the filtered solid and the filtrate were evaporated under vacuum pressure. From 115 g (191.35 mmol) of the ligand, 150.0 g (198 mmol, >99%) of the catalyst precursor was obtained in the filtrate and stored in the toluene solution (1.9446 g/mmol).

NMR standard purity (wt %)=100%. Mw=641.05. $^1$H NMR (500 MHz, CDCl$_3$): 0.87 (6H, m), 1.14 (18H, m), 1.11-1.59 (16H, m), 2.61, 2.81 (4H, m), 3.30 (4H, m), 5.54 (1H, s), 5.74 (1H, s), 6.88 (1H, m), 7.02 (1H, m), 7.28 (1H, m), 7.39 (1H, d), 7.47 (1H, t), 7.60-7.71 (1H, m).

Preparation Example 7

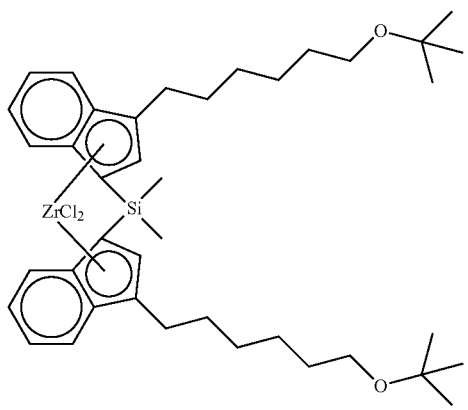

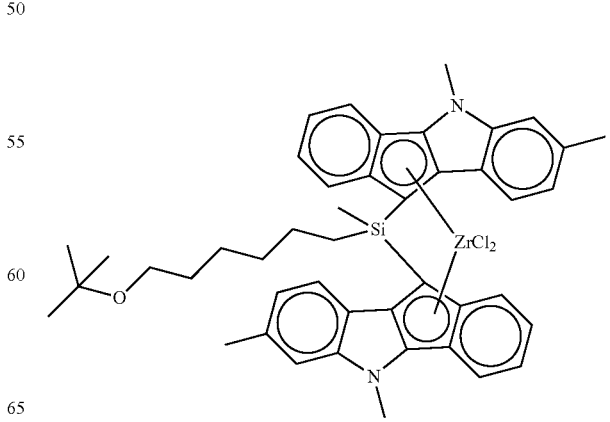

(1) Preparation of Ligand Compound 2.63 g (12 mmol) of 5-methyl-5,10-dihydroindeno[1,2-b]indole was added to a 250 mL flask and dissolved in 50 mL of THF. 6 mL of a 2.5 M n-BuLi hexane solution was added dropwise in a dry ice/acetone bath and stirred at room temperature overnight. In another 250 mL flask, 1.62 g (6 mmol) of (6-(tert-butoxy)hexyl)dichloro(methyl)silane was dissolved in 100 mL of hexane, and a lithiated solution of 5-methyl-5,10-dihydroindeno[1,2-b]indole was slowly added dropwise under a dry ice/acetone bath, and stirred at room temperature overnight. After reaction, the mixture was extracted with ether/water, and then the residual water in the organic layer was removed with $MgSO_4$ and vacuum dried to obtain 3.82 g (6 mmol) of the ligand compound, and this was confirmed by 1H-NMR.

$^1$H NMR (500 MHz, CDCl3): −0.33 (3H, m), 0.86~1.53 (10H, m), 1.16 (9H, d), 3.18 (2H, m), 4.07 (3H, d), 4.12 (3H, d), 4.17 (1H, d), 4.25 (1H, d), 6.95~7.92 (16H, m)

(2) Preparation of Transition Metal Compound 3.82 g (6 mmol) of the ligand compound synthesized in 2-1 above was dissolved in 100 mL of toluene and 5 mL of MTBE, and then 5.6 mL (14 mmol) of a 2.5 M n-BuLi hexane solution was added dropwise in a dry ice/acetone bath and stirred at room temperature overnight. 2.26 g (6 mmol) of $ZrCl_4(THF)_2$ was added to another flask, and 100 ml of toluene was added to prepare a slurry. The toluene slurry of $ZrCl_4(THF)_2$ was transferred to a litiated ligand in a dry ice/acetone bath. It was stirred overnight at room temperature and changed to violet color. The reaction solution was filtered to remove LiCl. The obtained filtrate was vacuum dried, and hexane was added thereto and sonicated. The slurry was filtered to obtain 3.40 g (yield: 71.1 mol %) of a dark violet transition metal compound as a filtered solid.

$^1$H NMR (500 MHz, CDCl3): 1.74 (3H, d), 0.85~2.33 (10H, m), 1.29 (9H, d), 3.87 (3H, s), 3.92 (3H, s), 3.36 (2H, m), 6.48~8.10 (16H, m)

EXAMPLE

Example 1

(1) Preparation of Cocatalyst-Supported Support

In a 300 mL glass reactor, 100 mL of toluene was added and 10 g of silica (SP2410 available from Grace Davison) was added thereto. The mixture was stirred while raising the temperature of the reactor to about 40° C. After sufficiently dispersing the silica, 60 mL of a methylaluminoxane (MAO) solution (10 wt % in toluene) (Albemarle) was added to the reactor. After raising the temperature of the reactor to about 60° C., it was stirred at about 200 rpm for about 12 hours. After that, the temperature of the reactor was lowered to about 40° C., and stirring was stopped. After sitting for about 10 minutes, the reaction solution was decanted. To the resulting reaction, 100 ml of toluene was added, and the mixture was stirred for about 10 minutes, and stirring was stopped. After sitting for 10 minutes, toluene was decanted. As a result, a cocatalyst-supported support ($MAO/SiO_2$) was obtained.

(2) Preparation of Supported Catalyst 50 mL of toluene was added to a reactor containing a cocatalyst-supported support ($MAO/SiO_2$), and 0.8 g of the transition metal compound prepared in Preparation Example 1 and 10 ml of toluene were added to a reactor and stirred at 200 rpm for 60 minutes. 10.0 g of the transition metal compound prepared in Preparation Example 4 and 10 ml of toluene were added to the reactor and stirred at 200 rpm for 12 hours. After stirring was stopped, the reaction solution was allowed to stand for 10 minutes and decanted. 100 ml of hexane was added to the reactor, and the resulting mixture was placed in a 200 ml Schlenk flask and the hexane solution was decanted. After that, the mixture was dried under reduced pressure at room temperature (23±5° C.) for 3 hours to obtain a hybrid supported catalyst.

(3) Preparation of Polyethylene Copolymer

While adding 34 kg/h of hexane, 10 kg/h of ethylene, 1.06 g/h of hydrogen, 600 to 720 ml/h of 1-butene, and 35 g/h of Teal to a 200 L two-stage continuous high-pressure reactor, 7 to 10 g/h of the hybrid supported catalyst prepared above was mixed with a hexane solution and added thereto.

The mixture was stirred under a pressure of 8.0 bar with a three-stage agitator and a circulation pump so as to mix the polymerized product. The temperature of the reactor was maintained at 80° C. through a cooling jacket and an outer cooler, and the reactor level was maintained at 75% and transferred to a latter stage reactor with a pressure difference. In a slurry after the completion of reaction, hexane was primarily removed using a centrifugal separator and dried with a dryer via a hot $N_2$ purge. Thereby, about 9 kg/h of a polyethylene copolymer was obtained.

Example 2

(1) Preparation of Cocatalyst-Supported Support

The cocatalyst-supported support ($MAO/SiO_2$) was prepared in the same manner as in (1) of Example 1.

(2) Preparation of Supported Catalyst 50 mL of toluene was added to a reactor containing the cocatalyst-supported support ($MAO/SiO_2$), and 1.5 g of the transition metal compound prepared in Preparation Example 2 and 10 ml of toluene were added to a reactor, and stirred at 200 rpm for 60 minutes. 6.0 g of the transition metal compound prepared in Preparation Example 5 and 10 ml of toluene were added to the reactor, and stirred at 200 rpm for 12 hours. After stirring was stopped, the reaction solution was allowed to stand for 10 minutes and decanted. 100 ml of hexane was added to the reactor, and the resulting mixture was placed in a 200 ml Schlenk flask and the hexane solution was decanted. After that, the mixture was dried under reduced pressure at room temperature (23±5° C.) for 3 hours to obtain a hybrid supported catalyst.

(3) Preparation of Polyethylene Copolymer

The polyethylene copolymer was prepared in the same manner as in (3) of Example 1, except that the hybrid supported catalyst prepared in (2) of Example 2 and 3.50 g/h of hydrogen were used.

Example 3

(1) Preparation of Cocatalyst-Supported Support

The cocatalyst-supported support ($MAO/SiO_2$) was prepared in the same manner as in (1) of Example 1.

(2) Preparation of Supported Catalyst 50 mL of toluene was added to a reactor containing the cocatalyst-supported support ($MAO/SiO_2$), and 1.5 g of the transition metal compound prepared in Preparation Example 2 and 10 ml of toluene were added to a reactor, and stirred at 200 rpm for 60 minutes. 5.0 g of the transition metal compound prepared in Preparation Example 5 and 10 ml of toluene were added to the reactor, and stirred at 200 rpm for 12 hours. After stirring was stopped, the reaction solution was allowed to stand for 10 minutes and decanted. 100 ml of hexane was added to the reactor, and the resulting mixture was placed in a 200 ml Schlenk flask and the hexane solution was decanted. After that, the mixture was dried under reduced pressure at room temperature (23±5° C.) for 3 hours to obtain a hybrid supported catalyst.

(3) Preparation of Polyethylene Copolymer

The polyethylene copolymer was prepared in the same manner as in (3) of Example 2, except that the hybrid supported catalyst prepared in (2) of Example 2 and 3.45 g/h of hydrogen were used.

Example 4

(1) Preparation of Cocatalyst-Supported Support

The cocatalyst-supported support ($MAO/SiO_2$) was prepared in the same manner as in (1) of Example 1.

(2) Preparation of Supported Catalyst 50 mL of toluene was added to a reactor containing the cocatalyst-supported support ($MAO/SiO_2$), and 2.1 g of the transition metal compound prepared in Preparation Example 3 and 10 ml of toluene were added to a reactor, and stirred at 200 rpm for 60 minutes. 6.7 g of the transition metal compound prepared in Preparation Example 5 and 10 ml of toluene were added to the reactor, and stirred at 200 rpm for 12 hours. After stirring was stopped, the reaction solution was allowed to stand for 10 minutes and decanted. 100 ml of hexane was added to the reactor, and the resulting mixture was placed in a 200 ml Schlenk flask and the hexane solution was decanted. After that, the mixture was dried under reduced pressure at room temperature (23±5° C.) for 3 hours to obtain a hybrid supported catalyst.

(3) Preparation of Polyethylene Copolymer

The polyethylene copolymer was prepared in the same manner as in (3) of Example 1, except that the hybrid supported catalyst prepared in (2) of Example 4 and 1.50 g/h of hydrogen were used.

Example 5

(1) Preparation of Cocatalyst-Supported Support

The cocatalyst-supported support ($MAO/SiO_2$) was prepared in the same manner as in (1) of Example 1.

(2) Preparation of Supported Catalyst 50 mL of toluene was added to a reactor containing the cocatalyst-supported support ($MAO/SiO_2$), and 2.1 g of the transition metal compound prepared in Preparation Example 1 and 10 ml of toluene were added to a reactor and stirred at 200 rpm for 60 minutes. 1.8 g of the transition metal compound prepared in Preparation Example 6 and 10 ml of toluene were added to the reactor, and stirred at 200 rpm for 12 hours. Here, 3.4 g of the transition metal compound prepared in Preparation Example 7 and 10 ml of toluene were added to the reactor, and stirred at 200 rpm for 12 hours. After stirring was stopped, the reaction solution was allowed to stand for 10 minutes and decanted. 100 ml of hexane was added to the reactor, and the resulting mixture was placed in a 200 ml Schlenk flask and the hexane solution was decanted. After that, the mixture was dried under reduced pressure at room temperature (23±5° C.) for 3 hours to obtain a hybrid supported catalyst.

(3) Preparation of Polyethylene Copolymer

The polyethylene copolymer was prepared in the same manner as in (3) of Example 1, except that the hybrid supported catalyst prepared in (2) of Example 5 and 0.8 g/h of hydrogen were used.

COMPARATIVE EXAMPLE

Comparative Example 1

An ethylene-1-hexene copolymer [XP9000 product available from Daelim Industrial] was used.

Comparative Example 2

An ethylene-1-octene copolymer [DX800 available from SK Global Chemical] was used.

Comparative Example 3

(1) Preparation of Cocatalyst-Supported Support

In a 300 mL glass reactor, 100 mL of toluene was added and 10 g of silica (SP2410 available from Grace Davison) was added. The mixture was stirred while raising the temperature of the reactor to about 40° C. After sufficiently dispersing the silica, 60 mL of a methylaluminoxane (MAO) solution (10 wt % in toluene) (Albemarle) was added to the reactor. After raising the temperature of the reactor to about 60° C., it was stirred at about 200 rpm for about 12 hours. After that, the temperature of the reactor was lowered to about 40° C., and stirring was stopped. After sitting for about 10 minutes, the reaction solution was decanted. To the resulting reaction, 100 ml of toluene was added, and the mixture was stirred for about 10 minutes, and stirring was stopped. After sitting for 10 minutes, toluene was decanted. As a result, a cocatalyst-supported support ($MAO/SiO_2$) was obtained.

(2) Preparation of Supported Catalyst 50 mL of toluene was added to a reactor containing a cocatalyst-supported support ($MAO/SiO_2$), and 2.1 g of the transition metal compound of the following Chemical Formula A and 10 ml of toluene were added to a reactor and stirred at 200 rpm for 60 minutes. 6.7 g of the transition metal compound prepared in Preparation Example 5 and 10 ml of toluene were added to the reactor and stirred at 200 rpm for 12 hours. After stirring was stopped, the reaction solution was allowed to stand for 10 minutes and decanted. 100 ml of hexane was added to the reactor, and the resulting mixture was placed in a 200 ml Schlenk flask and the hexane solution was decanted. After that, the mixture was dried under reduced pressure at room temperature (23±5° C.) for 3 hours to obtain a hybrid supported catalyst.

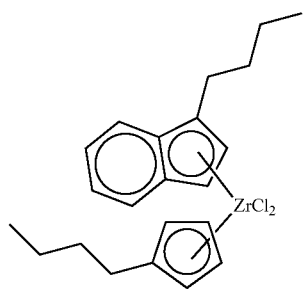

[Chemical Formula A]

(3) Preparation of Polyethylene Copolymer

While adding 34 kg/h of hexane, 10 kg/h of ethylene, 1.50 g/h of hydrogen, 600 to 720 ml/h of 1-butene and 35 g/h of Teal to a 200 L two-stage continuous high-pressure reactor, 7 to 10 g/h of the hybrid supported catalyst prepared above was mixed with a hexane solution and added thereto.

The mixture was stirred under a pressure of 8.0 bar with a three-stage agitator and a circulation pump so as to mix the polymerized product. The temperature of the reactor was maintained at 80° C. through a cooling jacket and an outer cooler, and the reactor level was maintained at 75% and transferred to a rear stage reactor with a pressure difference. In a slurry after the completion of reaction, hexane was primarily removed using a centrifugal separator and dried with a dryer via a hot $N_2$ purge.

Thereby, about 9 kg/h of a polyethylene copolymer was obtained.

REFERENCE EXAMPLE

Reference Example 1

(1) Preparation of Cocatalyst-Supported Support

The cocatalyst-supported support ($MAO/SiO_2$) was prepared in the same manner as in (1) of Example 1.

(2) Preparation of Supported Catalyst 50 mL of toluene was added to a reactor containing the cocatalyst-supported support ($MAO/SiO_2$), and 0.8 g of the transition metal compound prepared in Preparation Example 1 and 10 ml of toluene were added to a reactor, and stirred at 200 rpm for 60 minutes. 10 g of the transition metal compound prepared in Preparation Example 4 and 10 ml of toluene were added to the reactor, and stirred at 200 rpm for 12 hours. After stirring was stopped, the reaction solution was allowed to stand for 10 minutes and decanted. 100 ml of hexane was added to the reactor, and the resulting mixture was placed in a 200 ml Schlenk flask and the hexane solution was decanted. After that, the mixture was dried under reduced pressure at room temperature (23±5° C.) for 3 hours to obtain a hybrid supported catalyst.

(3) Preparation of Polyethylene Copolymer

The polyethylene copolymer was prepared in the same manner as in (3) of Example 1, except that the hybrid supported catalyst prepared in (2) of Reference Example 1 and 1.50 g/h of hydrogen were used.

Reference Example 2

(1) Preparation of Cocatalyst-Supported Support

The cocatalyst-supported support ($MAO/SiO_2$) was prepared in the same manner as in (1) of Example 1.

(2) Preparation of Supported Catalyst 50 mL of toluene was added to a reactor containing the cocatalyst-supported support ($MAO/SiO_2$), and 0.8 g of the transition metal compound prepared in Preparation Example 1 and 10 ml of toluene were added to a reactor, and stirred at 200 rpm for 60 minutes. 10 g of the transition metal compound prepared in Preparation Example 4 and 10 ml of toluene were added to the reactor, and stirred at 200 rpm for 12 hours. After stirring was stopped, the reaction solution was allowed to stand for 10 minutes and decanted. 100 ml of hexane was added to the reactor, and the resulting mixture was placed in a 200 ml Schlenk flask and the hexane solution was decanted. After that, the mixture was dried under reduced pressure at room temperature (23±5° C.) for 3 hours to obtain a hybrid supported catalyst.

(3) Preparation of Polyethylene Copolymer

The polyethylene copolymer was prepared in the same manner as in (3) of Example 1, except that the hybrid supported catalyst prepared in (2) of Reference Example 2 and 1.40 g/h of hydrogen were used.

Reference Example 3

(1) Preparation of Cocatalyst-Supported Support

The cocatalyst-supported support ($MAO/SiO_2$) was prepared in the same manner as in (1) of Example 1.

(2) Preparation of Supported Catalyst 50 mL of toluene was added to a reactor containing the cocatalyst-supported support ($MAO/SiO_2$), and 1.5 g of the transition metal compound prepared in Preparation Example 2 and 10 ml of toluene were added to a reactor, and stirred at 200 rpm for 60 minutes. 6.0 g of the transition metal compound prepared in Preparation Example 5 and 10 ml of toluene were added to the reactor, and stirred at 200 rpm for 12 hours. After stirring was stopped, the reaction solution was allowed to stand for 10 minutes and decanted. 100 ml of hexane was added to the reactor, and the resulting mixture was placed in a 200 ml Schlenk flask and the hexane solution was decanted. After that, the mixture was dried under reduced pressure at room temperature (23±5° C.) for 3 hours to obtain a hybrid supported catalyst.

(3) Preparation of Polyethylene Copolymer

The polyethylene copolymer was prepared in the same manner as in (3) of Example 1, except that the hybrid supported catalyst prepared in (2) of Reference Example 3 and 3.2 g/h of hydrogen were used.

Test Example

The physical properties of the polyethylene copolymers obtained according to the examples, comparative examples and reference examples were evaluated by the following method, and the results are shown in Table 1 below.

(1) Density (unit: $g/cm^3$): Measured according to the ASTM D1505 standard.

(2) Melt index (MI, unit: g/10 min): The weight of the molten polyethylene copolymer passing through a 2.1 mm orifice at 190° C. for 10 minutes under the condition of applying a force of 2.16 kg or 21.6 kg in the vertical direction with respect to gravity was measured according to the ASTM D1238 standard.

(3) Average value of SCB (Short Chain Branch: branch of 2 to 7 carbon atoms per 1000 carbon atoms) unit: number/ 1000 C) content The molecular weight (M) was determined using gel permeation chromatography (GPC).

Specifically, the logarithm of the molecular weight (log M) is represented by the x-axis.

A molecular weight distribution curve was obtained using gel permeation chromatography (GPC), wherein the molecular weight (M), specifically the log value (log M) of the molecular weight, is represented by the x-axis, and the polymer chain content (dwt/d log M) relative to the molecular weight value is represented by the y-axis. This is indicated by the continuous solid line in FIG. 1.

Subsequently, an FT-IR device connected to a GPC device was used for an SCB distribution curve wherein the molecular weight (M) obtained by gel permeation chromatography, specifically the log value (log M) of the molecular weight, is represented by the x-axis, and the side chain branch content of 2 to 7 carbon atoms per 1000 carbon atoms relative to the molecular weight value obtained by FT-IR is represented by the y-axis.

The average value of the side chain branch content of 2 to 7 carbon atoms per 1000 carbon atoms that each of the plurality of polymer chains contained in the polyethylene copolymer has was calculated using the SCB distribution curve.

The average value was obtained by dividing the total of the side chain branch content of 2 to 7 carbon atoms per 1000 carbon atoms that each of the plurality of polymer chains contained in the polyethylene copolymer has by the number of the polymer chains contained in the polyethylene copolymer.

At this time, measuring instruments and measurement conditions of the gel permeation chromatography are as follows.

<Measuring Instrument> Polymer Laboratories PLgel MIX-B 300 mm Column, Waters PL-GPC220

<Measurement Condition>

The evaluation temperature was 160° C., 1,2,4-trichlorobenzene was used as a solvent, the flow rate was 1 mL/min, samples were prepared at a concentration of 10 mg/10 mL and then fed in an amount of 200 μL, and the values of Mw, Mn, and PDI can be determined using a calibration curve formed using a polystyrene standard. The molecular weight of the polystyrene standards used was 9 types of 2000/10,000/30,000/70,000/200,000/700,000/2,000,000/4,000,000/10,000,000.

Further, the FT-IR measuring instruments and measurement conditions are as follows.

<Measuring Instrument> PerkinElmer Spectrum 100

<Measurement Condition>

Wavenumber: 2700 $cm^{-1}$ to 3000 $cm^{-1}$

Number of scans: 16

Resolution: 8 $cm^{-1}$

Detector: DTGS (4) SCG index (unit: g/10 min): defined as a value (p/q) obtained by dividing the melt index measured by ASTM 1238 (load of 21.6 kg, 190° C.) by the following CDI(q).

(5) Comonomer Distribution Index (CDI): Referring to FIG. 2, a molecular weight distribution curve (shown by a continuous solid line in FIG. 2) was obtained using gel permeation chromatography (GPC,) wherein the molecular weight (M), specifically the log value (log M) of the molecular weight, is represented by the x-axis, and the polymer chain content (dwt/d log M) relative to the molecular weight value is represented by the y-axis. The SCB (short chain branch) content (c) of the polymer chain which is a molecular weight value m satisfying the following Equation 2, and the SCB (short chain branch) content (d) of the polymer chain which is a molecular weight value n satisfying the following Equation 3, were measured using an FT-IR device connected to a GPC device. The contents of GPC and FT-IR are the same as those described in "(3) Average value of the short chain branch (SCB) (branch of 2 to 7 carbon atoms per 1000 carbon atoms) unit: number/1000 C) content".

$$\int_a^m f(x)dx = 0.8 \int_a^b f(x)dx \quad \text{[Equation 2]}$$

$$\int_a^n f(x)dx = 0.2 \int_a^b f(x)dx \quad \text{[Equation 3]}$$

In Equations 2 and 3, a is the minimum value of molecular weight which is represented by the x-axis in the molecular weight distribution curve by GPC, b is the maximum value of the molecular weight which is represented by the x-axis in the molecular weight distribution curve by GPC, f(x) is a function formula of the molecular weight distribution curve obtained using gel permeation chromatography (GPC) wherein the molecular weight (M), specifically the log value (log M) of the molecular weight, is represented by the x-axis, and the polymer chain content (dwt/d log M) relative to the molecular weight value is represented by the y-axis.

Then, the value (c/d) obtained by dividing the SCB (short chain branch) content (c) of a polymer chain which is a molecular weight m satisfying Equation 2 by the SCB (short chain branch) content (d) of a polymer chain which is a molecular weight n satisfying Equation 3 was defined as the Comonomer Distribution Index (CDI) and calculated.

(6) S.H. Modulus (unit: MPa): measured according to the ISO 18488 standard.

(7) Stress crack resistance (Full Notch Creep Test (FNCT), unit: hour (h)): Measured according to the ISO 16770 standard under the conditions of 80° C., 4 MPa, and an IGEPAL CA-630 10% solution.

TABLE 1

| | Example 1 | Example 2 | Example 3 | Example 4 | Example 5 | Comparative Example 1 |
|---|---|---|---|---|---|---|
| Transition metal compound | Preparation Example 1/ Preparation Example 4 | Preparation Example 2/ Preparation Example 5 | Preparation Example 2/ Preparation Example 5 | Preparation Example 3/ Preparation Example 5 | Preparation Example 1/ Preparation Example 6/ Preparation Example 7 | — |
| Comonomer | 1-butene | 1-butene | 1-butene | 1-butene | 1-butene | 1-hexene |
| Addition amount of hydrogen (g/h) | 1.06 | 3.50 | 3.45 | 1.50 | 0.80 | |
| Density | 0.9383 | 0.9370 | 0.9355 | 0.9397 | 0.9365 | 0.9346 |
| MI(2.16 Kg) | 0.226 | 0.502 | 0.591 | 0.174 | 0.036 | 0.600 |
| MI(21.6 Kg) | 15.965 | 17.076 | 24.458 | 9.644 | 9.574 | 13.200 |
| Average value of SCB content [number/1000 C] | 7.2 | 8.7 | 10.1 | 7.3 | 7.2 | 6.5 |
| CDI | 1.80 | 2.20 | 2.56 | 1.91 | 1.23 | 1.05 |
| SCG index | 8.9 | 7.8 | 9.6 | 5.0 | 7.8 | 12.6 |
| SCG index/(carbon number of comonomer)$^{1/2}$ | 4.45 | 3.9 | 4.8 | 2.5 | 3.9 | 5.14 |
| S.H. Modulus (80° C.) | 0.92 | 0.92 | 0.90 | 0.97 | 0.97 | 0.76 |
| FNCT(4 MPa) | more than 2527 | 1963 | more than 2915 | more than 3118 | more than 8615 | 20 |

TABLE 1-continued

|  | Comparative Example 2 | Comparative Example 3 | Reference Example 1 | Reference Example 2 | Reference Example 3 |
| --- | --- | --- | --- | --- | --- |
| Transition metal compound | — | Formula A/Preparation Example 5 | Preparation Example 1/ Preparation Example 4 | Preparation Example 1/ Preparation Example 4 | Preparation Example 2/ Preparation Example 5 |
| Comonomer | 1-octene | 1-butene | 1-butene | 1-butene | 1-butene |
| Addition amount of hydrogen (g/h) |  | 1.50 | 1.50 | 1.40 | 3.20 |
| Density | 0.9337 | 0.9341 | 0.9365 | 0.9362 | 0.9375 |
| MI(2.16 Kg) | 0.640 | 0.653 | 0.604 | 0.439 | 0.765 |
| MI(21.6 Kg) | 20.500 | 22.0 | 42.060 | 21.824 | 32.791 |
| Average value of SCB content [number/1000 C] | 6.8 | 6.7 | 8.5 | 8.4 | 9.5 |
| CDI | 0.94 | 0.87 | 1.85 | 1.56 | 2.17 |
| SCG index | 21.8 | 17.6 | 22.7 | 14.0 | 15.1 |
| SCG index/(carbon number of comonomer)$^{1/2}$ | 7.71 | 6.57 | 11.35 | 7 | 7.55 |
| S.H. Modulus (80° C.) | 0.76 | 0.77 | 0.77 | 0.84 | 0.82 |
| FNCT(4 MPa) | 425 | 350 | 71 | 155 | 130 |

As shown in Table 1, the polyethylene copolymers obtained in Examples 1 to 5 can satisfy the conditions that an SCG index is 5 to 9.6, CDI is 1.23 to 2.56, S.H. Modulus (measured at 80° C.) is 0.90 MPa to 0.97 MPa, the stress crack resistance (FNCT, measured at 4 MPa) is 1963 h or more, a melt index (measured at 190° C. under a load of 2.16 kg according to ASTM D 1238) is 0.036 g/10 min to 0.591 g/10 min, a melt index (measured at 190° C. under a load of 21.6 kg according to ASTM D 1238) is 9.574 g/10 min to 24.458 g/10 min, and the average value of the SCB content is 7.2/1000 C to 10.1/1000 C.

In addition, in the polyethylene copolymers obtained in Examples 1 to 5, the SCG index values are shown as 4.45 times, 3.9 times, 4.8 times, 2.5 times, and 3.9 times, respectively, as compared with the square root of the carbon number of the alpha olefin used as the comonomer, confirming that they satisfy 5 times or less compared to the square root value of the carbon number.

On the other hand, in the polyethylene copolymers obtained in Comparative Examples 1 to 3, SCG index values were shown as 5.14 times, 7.71 times, and 6.57 times, compared to the square root value of the carbon number of the alpha olefin used as the comonomer, which exceeds 5 times the square root value of the carbon number.

In addition, in the polyethylene copolymers obtained in Comparative Examples 1 to 3, the SCG index was shown to be 12.6 to 21.8, which is higher than that of the examples, S.H. modulus (measured at 80° C.) was shown to be 0.76 MPa to 0.77 MPa which is lower than that of the examples, and the stress crack resistance (FNCT, measured at 4 MPa) was shown to be 20 h to 425 h which is lower than that of the examples, thus confirming that the physical properties are deteriorated as compared with the examples.

The invention claimed is:

1. A polyethylene copolymer comprising an ethylene-derived repeating unit and an alpha-olefin-derived repeating unit having 3 or more carbon atoms, and satisfying the following Equation 1 and Equation 2:

$$\text{slow crack growth (SCG) index} \leq (\text{carbon number of the alpha olefin})^{1/2} \times 5 \quad \text{[Equation 1]}$$

wherein, in the above Equation 1,
the SCG index is a value (p/q) obtained by dividing melt index (p) of the polyethylene copolymer measured according to ASTM 1238 (load of 21.6 kg, 190° C.) by comonomer distribution index (q) of the polyethylene copolymer, and $$\text{comonomer distribution index (CDI)} = c/d \quad \text{[Equation 2]}$$

wherein, in the above Equation 2,
the comonomer distribution index (CDI) is calculated by the above Equation 2 based on a molecular weight distribution curve graph, measured by gel permeation chromatography with respect to the polyethylene copolymer, where x-axis represents the molecular weight of the polymer chain and y-axis represents a content of the polymer chain, c is short chain branch (SCB) content (measured by FT-IR) of 2 to 7 carbon atoms per 1000 carbon atoms of the polymer chain, which is a molecular weight value m in which an area (s1) between a molecular weight distribution curve and the x-axis in a section of $a \leq x \leq m$ is 80% of an area (s2) between the molecular weight distribution curve and the x-axis in a section of $a \leq x \leq b$, d is short chain branch (SCB) content (measured by FT-IR) of 2 to 7 carbon atoms per 1000 carbon atoms of the polymer chain, which is a molecular weight value n in which an area (s3) between the molecular weight distribution curve and the x-axis in a section of $a \leq x \leq n$ is 20% of an area (s4) between the molecular weight distribution curve and the x-axis in a section of $a \leq x \leq b$, and a is a minimum value of molecular weight which is represented by the x-axis in the molecular weight distribution curve graph, and b is a maximum value of molecular weight which is represented by the x-axis in the molecular weight distribution graph, wherein the polyethylene copolymer has a comonomer distribution index (CDI) of 1.2 to 3.0.

2. The polyethylene copolymer according to claim 1, wherein the polyethylene copolymer has a strain hardening (S.H.) modulus (measured at 80° C.) of 0.85 MPa or more.

3. The polyethylene copolymer according to claim 1, wherein the polyethylene copolymer has a stress crack resistance (FNCT, measured at 4 MPa) of 1000 h or more.

4. The polyethylene copolymer according to claim 1, wherein the polyethylene copolymer has a melt index (measured at 190° C. under a load of 2.16 kg according to ASTM D1238) of 0.01 g/10 min to 0.65 g/10 min.

5. The polyethylene copolymer according to claim 1, wherein the polyethylene copolymer has a melt index (measured at 190° C. under a load of 21.6 kg according to ASTM D1238) of 2 g/10 min to 30 g/10 min.

6. The polyethylene copolymer according to claim 1, wherein the polyethylene copolymer has an SCG index of 11 or less.

7. The polyethylene copolymer according to claim 1, wherein the polyethylene copolymer has a density (ASTM 1505) of 0.930 g/cm$^3$ to 0.945 g/cm$^3$.

8. The polyethylene copolymer according to claim 1, wherein an average value of the short chain branch content (measured by FT-IR) of 2 to 7 carbon atoms per 1000 carbon atoms that each of a plurality of polymer chains contained in the polyethylene copolymer has is 7/1000 C or more and 15/1,000 C or less.

9. A method for preparing the polyethylene copolymer of claim 1, comprising a step of polymerizing an ethylene monomer and an alpha olefin monomer in the presence of a hybrid supported catalyst which includes: a transition metal mixture including a first mixture including a first transition metal compound containing at least one compound represented by the following Chemical Formulas 2 or 3, and a second transition metal compound containing at least one compound represented by the following Chemical Formulas 4, 5, 6 or 7, or a second mixture including a first transition metal compound containing at least one compound represented by the following Chemical Formula 1, and a second transition metal compound containing at least one compound represented by select the following Chemical Formulas 4, 6 or 7; and a support on which the transition metal mixtures are supported:

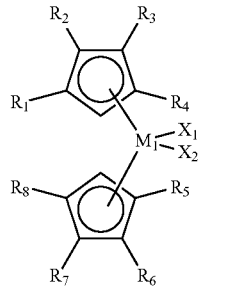

[Chemical Formula 1]

wherein, in Chemical Formula 1,
$M_1$ is a Group 4 transition metal;
$R_1$ to $R_8$ are the same as or different from each other and are each independently hydrogen, a $C_{1-20}$ alkyl, a $C_{2-20}$ alkenyl, a $C_{3-20}$ cycloalkyl, a $C_{6-20}$ aryl, a $C_{7-20}$ alkylaryl, —(CH$_2$)$_n$—OR$_a$, or a $C_{7-20}$ arylalkyl, or two or more adjacent groups are connected to each other to form a substituted or unsubstituted aliphatic or aromatic ring, provided that at least one of $R_1$ to $R_8$ is —(CH$_2$)$_n$—OR$_a$, where R$_a$ is a $C_{1-6}$ linear or branched alkyl group, and n is an integer of 2 to 10; and
$X_1$ and $X_2$ are the same as or different from each other and are each independently a halogen, a $C_{1-20}$ alkyl, a $C_{2-10}$ alkenyl, a $C_{3-20}$ cycloalkyl, a $C_{7-40}$ alkylaryl, a $C_{7-40}$ arylalkyl, a $C_{6-20}$ aryl, a $C_{1-20}$ alkylidene, an amino, a $C_{2-20}$ alkylalkoxy, or a $C_{7-40}$ arylalkoxy,

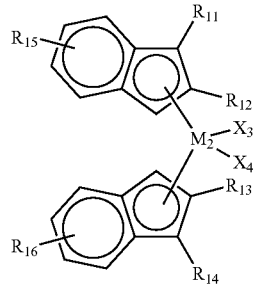

[Chemical Formula 2]

wherein, in Chemical Formula 2,
$M_2$ is a Group 4 transition metal;
$X_3$ and $X_4$ are the same as or different from each other and are each independently a halogen, a $C_{1-20}$ alkyl, a $C_{2-10}$ alkenyl, a $C_{3-20}$ cycloalkyl, a $C_{7-40}$ alkylaryl, a $C_{7-40}$ arylalkyl, a $C_{6-20}$ aryl, a $C_{1-20}$ alkylidene, an amino, a $C_{2-20}$ alkylalkoxy, or a $C_{7-40}$ arylalkoxy;
$R_{11}$ to $R_{14}$ are the same as or different from each other and are each independently hydrogen, a $C_{1-20}$ alkyl, a $C_{2-20}$ alkenyl, a $C_{3-20}$ cycloalkyl, a $C_{6-20}$ aryl, a $C_{7-20}$ alkylaryl, —(CH$_2$)$_m$—OR$_b$, or a $C_{7-20}$ arylalkyl, or two or more adjacent groups are connected to each other to form a substituted or unsubstituted aliphatic or aromatic ring, provided that at least one of $R_{11}$ to $R_{14}$ is —(CH$_2$)$_m$—OR$_b$, where R$_b$ is a $C_{1-6}$ linear or branched alkyl group, and m is an integer of 2 to 10; and
$R_{15}$ and $R_{16}$ are the same as or different from each other and are each independently hydrogen, a $C_{1-20}$ alkyl, a $C_{3-20}$ cycloalkyl, a $C_{1-10}$ alkoxy, a $C_{2-20}$ alkoxyalkyl, a $C_{6-20}$ aryl, a $C_{6-10}$ aryloxy, a $C_{2-20}$ alkenyl, a $C_{7-40}$ alkylaryl, a $C_{7-40}$ arylalkyl, a $C_{8-40}$ arylalkenyl, or a $C_{2-10}$ alkynyl,

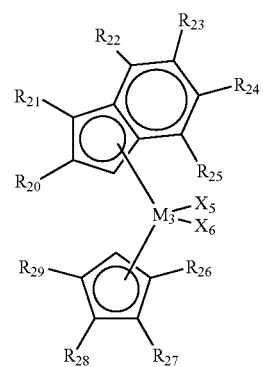

[Chemical Formula 3]

wherein, in Chemical Formula 3,
$M_3$ is a Group 4 transition metal;
$X_5$ and $X_6$ are the same as or different from each other and are each independently a halogen, a $C_{1-20}$ alkyl, a $C_{2-10}$ alkenyl, a $C_{3-20}$ cycloalkyl, a $C_{7-40}$ alkylaryl, a $C_{7-40}$ arylalkyl, a $C_{6-20}$ aryl, a $C_{1-20}$ alkylidene, an amino, a $C_{2-20}$ alkylalkoxy, or a $C_{7-40}$ arylalkoxy; and
$R_{20}$ to $R_{29}$ are the same as or different from each other and are each independently hydrogen, a $C_{1-20}$ alkyl, a $C_{3-20}$ cycloalkyl, a $C_{1-10}$ alkoxy, a $C_{2-20}$ alkoxyalkyl, a $C_{6-20}$ aryl, a $C_{6-10}$ aryloxy, a $C_{2-20}$ alkenyl, a $C_{7-40}$ alkylaryl, a $C_{7-40}$ arylalkyl, a $C_{8-40}$ arylalkenyl, or a $C_{2-10}$ alkynyl, provided that at least one of $R_{20}$ to $R_{29}$ is —(CH$_2$)$_p$—

$OR_c$, where $R_c$ is a $C_{1-6}$ linear or branched alkyl group, and p is an integer of 2 to 10,

[Chemical Formula 4]

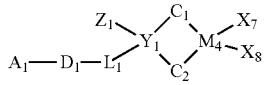

wherein, in Chemical Formula 4,
$A_1$ is hydrogen, a halogen, a $C_{1-20}$ alkyl group, a $C_{2-20}$ alkenyl group, a $C_{6-20}$ aryl group, a $C_{7-20}$ alkylaryl group, a $C_{7-20}$ arylalkyl group, a $C_{1-20}$ alkoxy group, a $C_{2-20}$ alkoxyalkyl group, a $C_{3-20}$ heterocycloalkyl group, or a $C_{5-20}$ heteroaryl group;
$D_1$ is —O—, —S—, —N(R)—, or —Si(R)(R')—, wherein R and R' are the same as or different from each other and are each independently hydrogen, a halogen, a $C_{1-20}$ alkyl group, a $C_{2-20}$ alkenyl group, or a $C_{6-20}$ aryl group;
$L_1$ is a $C_{1-10}$ linear or branched alkylene group;
$Y_1$ is carbon, silicon, or germanium;
$Z_1$ is hydrogen, a halogen, a $C_{1-20}$ alkyl group, a $C_{2-20}$ alkenyl group, a $C_{6-20}$ aryl group, a $C_{7-20}$ alkylaryl group, or a $C_{7-20}$ arylalkyl group;
$M_4$ is a Group 4 transition metal;
$X_7$ and $X_8$ are the same as or different from each other and are each independently a halogen, a $C_{1-20}$ alkyl, a $C_{2-10}$ alkenyl, a $C_{3-20}$ cycloalkyl, a $C_{7-40}$ alkylaryl, a $C_{7-40}$ arylalkyl, a $C_{6-20}$ aryl, a $C_{1-20}$ alkylidene, an amino, a $C_{2-20}$ alkylalkoxy, or a $C_{7-40}$ arylalkoxy;
$C_1$ is represented by the following Chemical Formula 4a,

[Chemical Formula 4a]

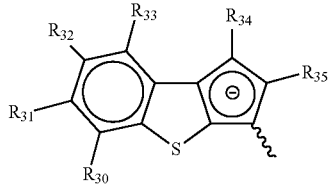

$C_2$ is —$NR_{36}$—; and
$R_{30}$ to $R_{36}$ are the same as or different from each other and are each independently hydrogen, a halogen, a $C_{1-20}$ alkyl group, a $C_{2-20}$ alkenyl group, a $C_{1-20}$ alkylsilyl group, a $C_{1-20}$ silylalkyl group, a $C_{1-20}$ alkoxysilyl group, a $C_{1-20}$ alkoxy group, a $C_{6-20}$ aryl group, a $C_{7-20}$ alkylaryl group, or a $C_{7-20}$ arylalkyl group, or two or more adjacent groups of $R_{30}$ to $R_{35}$ are connected to each other to form a substituted or unsubstituted aliphatic or aromatic ring,

[Chemical Formula 5]

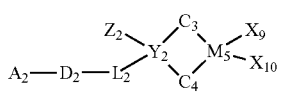

wherein, in Chemical Formula 5,
$A_2$ is hydrogen, a halogen, a $C_{1-20}$ alkyl group, a $C_{2-20}$ alkenyl group, a $C_{6-20}$ aryl group, a $C_{7-20}$ alkylaryl group, a $C_{7-20}$ arylalkyl, a $C_{1-20}$ alkoxy group, a $C_{2-20}$ alkoxyalkyl group, a $C_{3-20}$ heterocycloalkyl group, or a $C_{5-20}$ heteroaryl group;
$D_2$ is —O—, —S—, —N(R)—, or —Si(R)(R')—, wherein R and R' are the same as or different from each other and are each independently hydrogen, a halogen, a $C_{1-20}$ alkyl group, a $C_{2-20}$ alkenyl group, or a $C_{6-20}$ aryl group;
$L_2$ is a $C_{1-10}$ linear or branched alkylene group;
$Y_2$ is carbon, silicon, or germanium;
$Z_2$ is hydrogen, a halogen, a $C_{1-20}$ alkyl group, a $C_{2-20}$ alkenyl group, a $C_{6-20}$ aryl group, a $C_{7-20}$ alkylaryl group, or $C_{7-20}$ arylalkyl group;
$M_5$ is a Group 4 transition metal;
$X_9$ and $X_{10}$ are the same as or different from each other and are each independently a halogen, a $C_{1-20}$ alkyl, a $C_{2-10}$ alkenyl, a $C_{3-20}$ cycloalkyl, a $C_{7-40}$ alkylaryl, a $C_{7-40}$ arylalkyl, a $C_{6-20}$ aryl, a $C_{1-20}$ alkylidene, an amino, a $C_{2-20}$ alkylalkoxy, or a $C_{7-40}$ arylalkoxy;
$C_3$ is represented by the following Chemical Formula 5a,

[Chemical Formula 5a]

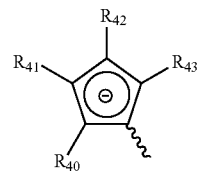

$C_4$ is —$NR_{44}$—; and
$R_{40}$ to $R_{44}$ are the same as or different from each other and are each independently hydrogen, a halogen, a $C_{1-20}$ alkyl group, a $C_{2-20}$ alkenyl group, a $C_{1-20}$ alkylsilyl group, a $C_{1-20}$ silylalkyl group, a $C_{1-20}$ alkoxysilyl group, a $C_{1-20}$ alkoxy group, a $C_{6-20}$ aryl group, a $C_{7-20}$ alkylaryl group, or a $C_{7-20}$ arylalkyl group, or two or more adjacent groups of $R_{40}$ to $R_{43}$ are connected to each other to form a substituted or unsubstituted aliphatic or aromatic ring,

[Chemical Formula 6]

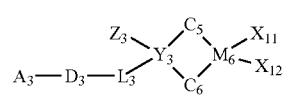

wherein, in Chemical Formula 6,
$A_3$ is hydrogen, a halogen, a $C_{1-20}$ alkyl group, a $C_{2-20}$ alkenyl group, a $C_{6-20}$ aryl group, a $C_{7-20}$ alkylaryl group, a $C_{7-20}$ arylalkyl, a $C_{1-20}$ alkoxy group, a $C_{2-20}$ alkoxyalkyl group, a $C_{3-20}$ heterocycloalkyl group, or a $C_{5-20}$ heteroaryl group;
$D_3$ is —O—, —S—, —N(R)—, or —Si(R)(R')—, wherein R and R' are the same as or different from each other and are each independently hydrogen, a halogen, a $C_{1-20}$ alkyl group, a $C_{2-20}$ alkenyl group, or a $C_{6-20}$ aryl group;
$L_3$ is a $C_{1-10}$ linear or branched alkylene group;
$Y_3$ is carbon, silicon, or germanium;
$Z_3$ is hydrogen, a halogen, a $C_{1-20}$ alkyl group, a $C_{2-20}$ alkenyl group, a $C_{6-20}$ aryl group, a $C_{7-20}$ alkylaryl group, or a $C_{7-20}$ arylalkyl group;
$M_6$ is a Group 4 transition metal;
$X_{11}$ and $X_{12}$ are the same as or different from each other and are each independently a halogen, a $C_{1-20}$ alkyl, a $C_{2-20}$ alkenyl, a $C_{3-20}$ cycloalkyl, a $C_{7-40}$ alkylaryl, a $C_{7-40}$ arylalkyl, a $C_{6-20}$ aryl, a $C_{1-20}$ alkylidene, an amino, a $C_{2-20}$ alkylalkoxy, or a $C_{7-40}$ arylalkoxy;

$C_5$ and $C_6$ are the same as or different from each other and are each independently represented by one of the following Chemical Formulas 6a to 6b,

[Chemical Formulas 6a]

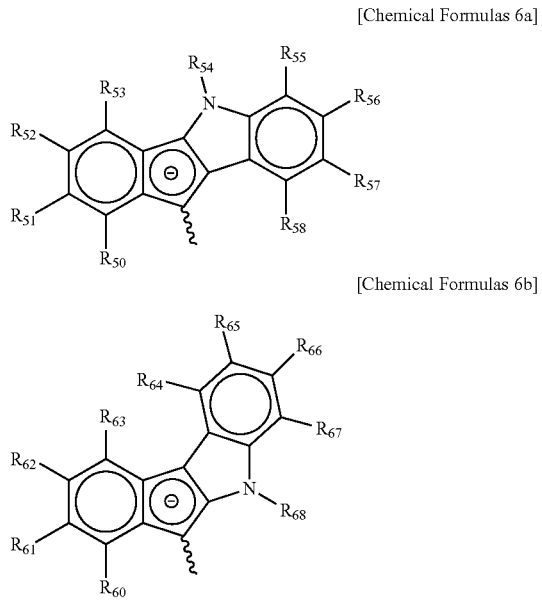

[Chemical Formulas 6b]

and $R_{50}$ to $R_{58}$, and $R_{60}$ to $R_{68}$, are the same as or different from each other and are each independently hydrogen, a halogen, a $C_{1-20}$ alkyl group, a $C_{2-20}$ alkenyl group, a $C_{1-20}$ alkylsilyl group, a $C_{1-20}$ silylalkyl group, a $C_{1-20}$ alkoxysilyl group, a $C_{1-20}$ alkoxy group, a $C_{6-20}$ aryl group, a $C_{7-20}$ alkylaryl group, or a $C_{7-20}$ arylalkyl group, or two or more adjacent groups of $R_{50}$ to $R_{58}$ and $R_{60}$ to $R_{68}$ are connected to each other to form a substituted or unsubstituted aliphatic or aromatic ring,

[Chemical Formula 7]

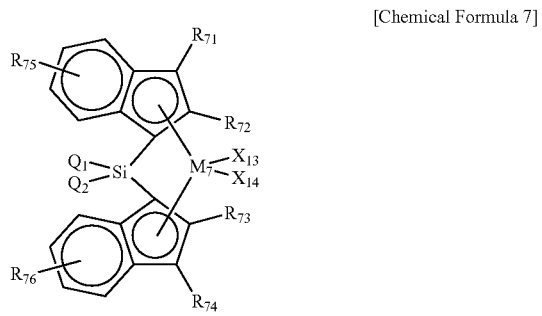

wherein, in Chemical Formula 7, $M_7$ is a Group 4 transition metal;

$X_{13}$ and $X_{14}$ are the same as or different from each other and are each independently a halogen, a $C_{1-20}$ alkyl, a $C_{2-10}$ alkenyl, a $C_{3-20}$ cycloalkyl, a $C_{7-40}$ alkylaryl, a $C_{7-40}$ arylalkyl, a $C_{6-20}$ aryl, a $C_{1-20}$ alkylidene, an amino, a $C_{2-20}$ alkylalkoxy, or a $C_{7-40}$ arylalkoxy;

$R_{71}$ to $R_{74}$ are the same as or different from each other and are each independently hydrogen, a $C_{1-20}$ alkyl, a $C_{2-20}$ alkenyl, a $C_{3-20}$ cycloalkyl, a $C_{6-20}$ aryl, a $C_{7-20}$ alkylaryl, $-(CH_2)_q-OR_d$, or a $C_{7-20}$ arylalkyl, or two or more adjacent groups are connected to each other to form a substituted or unsubstituted aliphatic or aromatic ring, provided that at least one of $R_{71}$ to $R_{74}$ is $-(CH_2)_q-OR_d$, where $R_d$ is a $C_{1-6}$ linear or branched alkyl group, and q is an integer of 2 to 10;

$R_{75}$ and $R_{76}$ are the same as or different from each other and are each independently hydrogen, a $C_{1-20}$ alkyl, a $C_{3-20}$ cycloalkyl, a $C_{1-10}$ alkoxy, a $C_{2-20}$ alkoxyalkyl, a $C_{6-20}$ aryl, a $C_{6-10}$ aryloxy, a $C_{2-20}$ alkenyl, a $C_{7-40}$ alkylaryl, a $C_{7-40}$ arylalkyl, a $C_{8-40}$ arylalkenyl, or a $C_{2-10}$ alkynyl; and $Q_1$ and $Q_2$ are the same as or different from each other and are each independently hydrogen, a halogen, a $C_{1-20}$ alkyl, a $C_{2-20}$ alkenyl, a $C_{3-20}$ cycloalkyl, a $C_{6-20}$ aryl, a $C_{7-20}$ alkylaryl, or a $C_{7-20}$ arylalkyl.

10. The method for preparing the polyethylene copolymer according to claim 9, wherein the first transition metal compound is contained in an amount of 1 to 80 parts by weight based on 100 parts by weight of the second transition metal compound.

11. The method for preparing the polyethylene copolymer according to claim 9, wherein in the step of polymerizing the ethylene monomer and the alpha olefin monomer, hydrogen is added in an amount of 0.005 wt % to 0.040 wt % relative to the ethylene monomer.

12. The method for preparing the polyethylene copolymer according to claim 9, wherein the support is silica, alumina, magnesia, or a mixture thereof.

13. The method for preparing the polyethylene copolymer according to claim 9, wherein the alpha olefin monomer includes one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-eicocene.

14. A pipe comprising the polyethylene copolymer of claim 1.

15. The method for preparing the polyethylene copolymer according to claim 9, wherein the second transition metal compound contains a compound represented by Chemical Formula 6 and a compound represented by Chemical Formula 7, and the compound represented by Chemical Formula 7 is contained in an amount of 10 to 80 parts by weight based on 100 parts by weight of the compound represented by Chemical Formula 6.

16. The method for preparing the polyethylene copolymer according to claim 9, wherein the support contains a hydroxyl group on its surface.

* * * * *